United States Patent
Thiagarajan et al.

(10) Patent No.: US 9,100,799 B1
(45) Date of Patent: Aug. 4, 2015

(54) SYSTEMS AND METHODS FOR MESSAGE SHARING

(71) Applicant: Amazon Technologies, Inc., Reno, NV (US)

(72) Inventors: Arvind Thiagarajan, Mountain View, CA (US); David George Butler, San Jose, CA (US); Andrew David Price, Santa Clara, CA (US); Shih-Chun Chang, San Jose, CA (US); Yi Zhu, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 140 days.

(21) Appl. No.: 13/916,708

(22) Filed: Jun. 13, 2013

(51) Int. Cl.
*H04B 1/00* (2006.01)
*H04W 4/06* (2009.01)

(52) U.S. Cl.
CPC ....................................... *H04W 4/06* (2013.01)

(58) Field of Classification Search
CPC ..... H04W 8/005; H04W 8/26; H04W 40/246; H04W 48/16; H04W 4/06; H04W 84/12; H04W 88/08; H04W 88/16; H04B 1/00; H04B 7/00

USPC ........ 455/68, 70, 414.4, 432.2, 515; 370/312, 370/338

See application file for complete search history.

(56) References Cited

U.S. PATENT DOCUMENTS

| | | | | |
|---|---|---|---|---|
| 2006/0171388 | A1* | 8/2006 | Ikeda | 370/389 |
| 2007/0242643 | A1* | 10/2007 | Chandra et al. | 370/338 |
| 2008/0151848 | A1* | 6/2008 | Fischer et al. | 370/338 |
| 2010/0202339 | A1* | 8/2010 | Chieng et al. | 370/312 |
| 2014/0328334 | A1* | 11/2014 | Viswanathan et al. | 370/338 |

* cited by examiner

*Primary Examiner* — Minh D Dao
(74) *Attorney, Agent, or Firm* — Sutherland Asbill & Brennan LLP

(57) ABSTRACT

Systems and methods for broadcasting messages carried on one or more beacon signals are disclosed. A message sharing device may identify a message to be broadcast and may transmit the message to a base station to generate a beacon signal or generate the beacon signal itself based at least in part on the message. The beacon signal may include an indication that the beacon signal carries a message. The beacon signal may be broadcast and may be received by one or more message receiving devices. In some cases, the message may include a link to content accessible via one or more networks, such as the Internet.

20 Claims, 16 Drawing Sheets

SYSTEMS AND METHODS FOR MESSAGE SHARING

BACKGROUND

Users of electronic devices, such as personal electronic devices may wish to broadcast messages, such as short messages to other devices in its relative proximity. The messages that a user may desire to transmit by a particular electronic device may include an address and/or link to content at locations that may be accessible by the receiving electronic device.

Certain wireless communications protocols, such as Wi-Fi and or Wi-Fi direct, may have mechanisms for handshaking that use beacons that are transmitted by a wireless access point, base station, wireless router, and/or other electronic devices acting as a wireless router. These beacon signals are typically used by users in proximity of the wireless access point, base station, wireless router, and/or other electronic devices acting as a wireless router, such as within radio range. The beacon signals transmitted may carry information that allows an electronic device to communicatively link to the entity transmitting the beacon signal.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
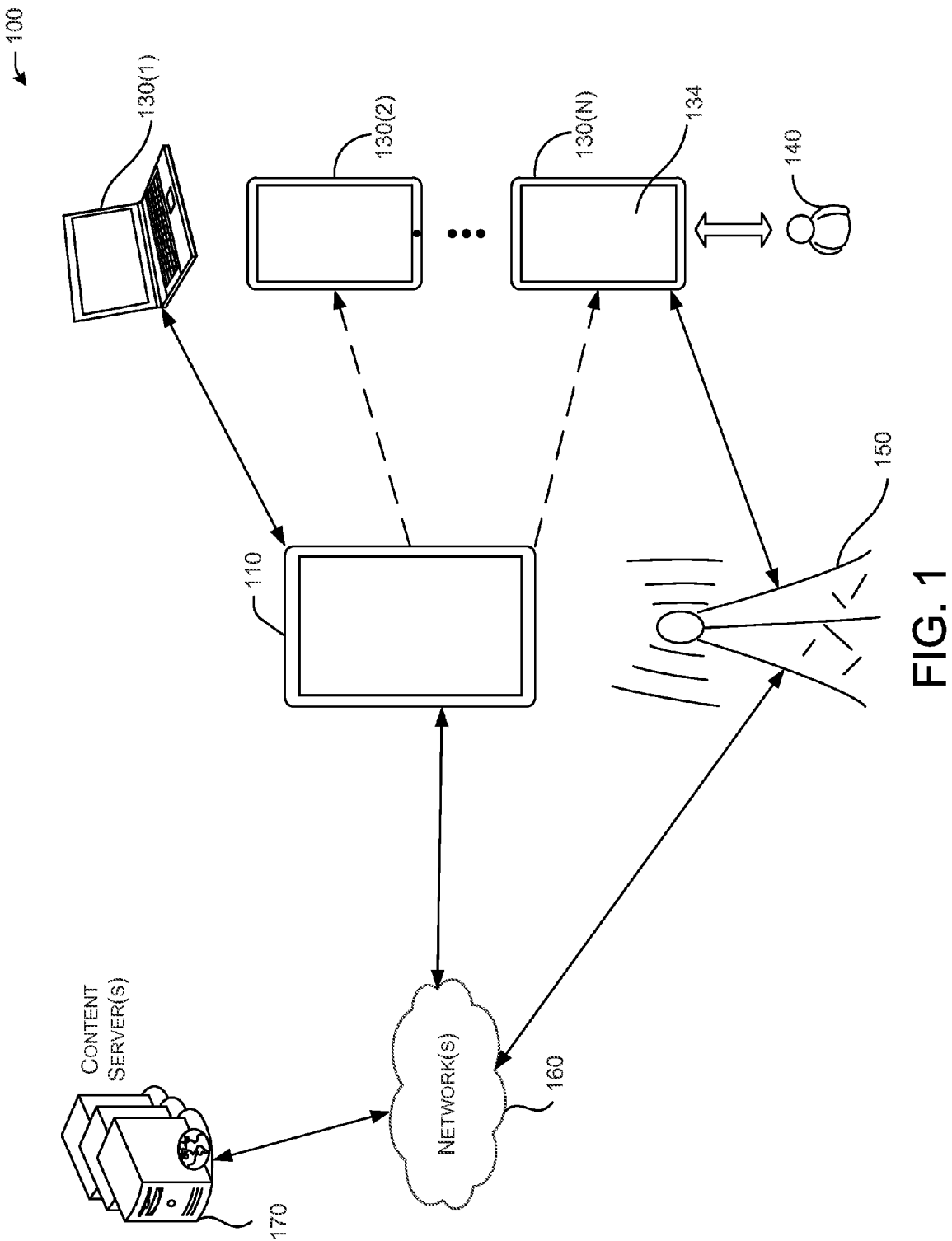
FIG. 1 is a schematic diagram that illustrates a use environment for transmitting and receiving a message, in accordance with example embodiments of the disclosure.

Example embodiments of the present disclosure may include systems and methods for broadcasting a message by a base station and/or other electronic device operating as a base station or network access point. Further example embodiments of the disclosure may include systems and methods for receiving the broadcasted message by a message receiving device and displaying the message to a user of the message receiving device. Yet further example embodiments of the disclosure may entail the message receiving device receiving a broadcast message that includes an address and/or link to content and accessing a content server associated with the address and/or link. In some cases, the message broadcast may be performed by the message sharing device operating as a base station. The message may be broadcast by the base station and/or the message sharing device operating as a base station as part of a beacon signal. Therefore, in certain example embodiments of the disclosure, the message may be incorporated into the beacon signal by the base station and/or the message sharing device. The beacon signal may, in certain example embodiments, be a beacon signal associated with an established communications protocol, such as Wi-Fi, Bluetooth, and/or Wi-Fi direct. In certain example embodiments, the message may be incorporated in a service set identification (SSID) field of the beacon signal. The beacon signal may also carry one or more symbols and/or sequence of characters that indicate that the beacon signal is carrying a message. Therefore, the message may be carried by, and may be identified from beacon signals that are similar to beacon signals that are used for networking and/or handshaking functionality with existing communications protocols.

In example embodiments, the message receiving device may receive the beacon signal, such as wirelessly, using RF infrastructure (i.e. antenna(s), radio(s), and/or electronics) of the message receiving device. In some cases the RF infrastructure of the message receiving device is infrastructure that is used for other communications function such as communicating with one or more wireless networks, such as a Wi-Fi network or a Wi-Fi direct link. The message receiving device may execute instructions and/or application(s) thereon that enable the message receiving device to identify that the received beacon signal carries a message and then identify the message based at least in part on the received beacon signal. Therefore, the message receiving device may extract the message from the received beacon signal. In certain example embodiments, the message receiving device may recognize one or more symbols and/or characters within one or more fields of the received beacon symbol to determine that the beacon signal is carrying a message, rather than only information for indicating the availability of a wireless network. The message receiving device may further be configured to parse portions, such as the SSID field, of the received beacon signal to determine and/or extract the message carried thereon.

In certain example embodiments, the message receiving device may be communicatively coupled to the base station and/or the message sharing device acting as a base station in a manner that enables two way communications and/or connectivity to a larger network such as a wide area network (WAN) and/or the Internet. For example, the message receiving device may be using the services of a base station from which it receives the beacon signal carrying the message. In other example embodiments, the message receiving device may be configured to receive beacon signals from the base station and/or message sharing device acting as a base station and may not have access to other networks, such as a WANs and/or the Internet, via that base station. In other words, the message receiving device may not be paired with the base station and/or message sharing device from which it receives a beacon signal carrying a message.

In certain further example embodiments, the message receiving device may identify a link and/or a network address, such as a website address on the Internet, within the received message. In these cases, the message receiving device may be configured to utilize the link and/or the network address to access and/or receive content associated with that link and/or network address. In other words, the message receiving device, based at least in part on the received message, may retrieve content via one or more networks, such as a WAN and/or the Internet. In certain example embodiments, where the message receiving device is communicatively connected to one or more networks via the base station and/or message sharing device, the message receiving device may access the networks and/or content associated with the message via the base station and/or message sharing device from which it got the message. In other example embodiments, the message receiving device may access the content associated with the message via communicative links other than via the base station and/or message sharing device from which it received the message.

In certain example embodiments, the message sharing device may share more than one message. This may be done if the length of the message is too long to be carried by a single beacon signal. In other cases, this may be done to provide a message receiving device with a link to access content in one message and a password or other authentication credential to access the content. This mechanism may be used, for example, in a meeting, where one may want to quickly and automatically provide a link to content, such as a presentation, to be discussed during the meeting. In some of these cases, the content may be password protected for maintaining confidentiality.

It will be appreciated that the message broadcast mechanism as discussed above may enable the broadcast of messages, such as messages with content links thereon, without a message receiving device having to connect to a particular base station and or network access point. Indeed, in some cases, the message receiving device may utilize communications links that are out-of-band relative to the receipt of the message to access content associated with the received message.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
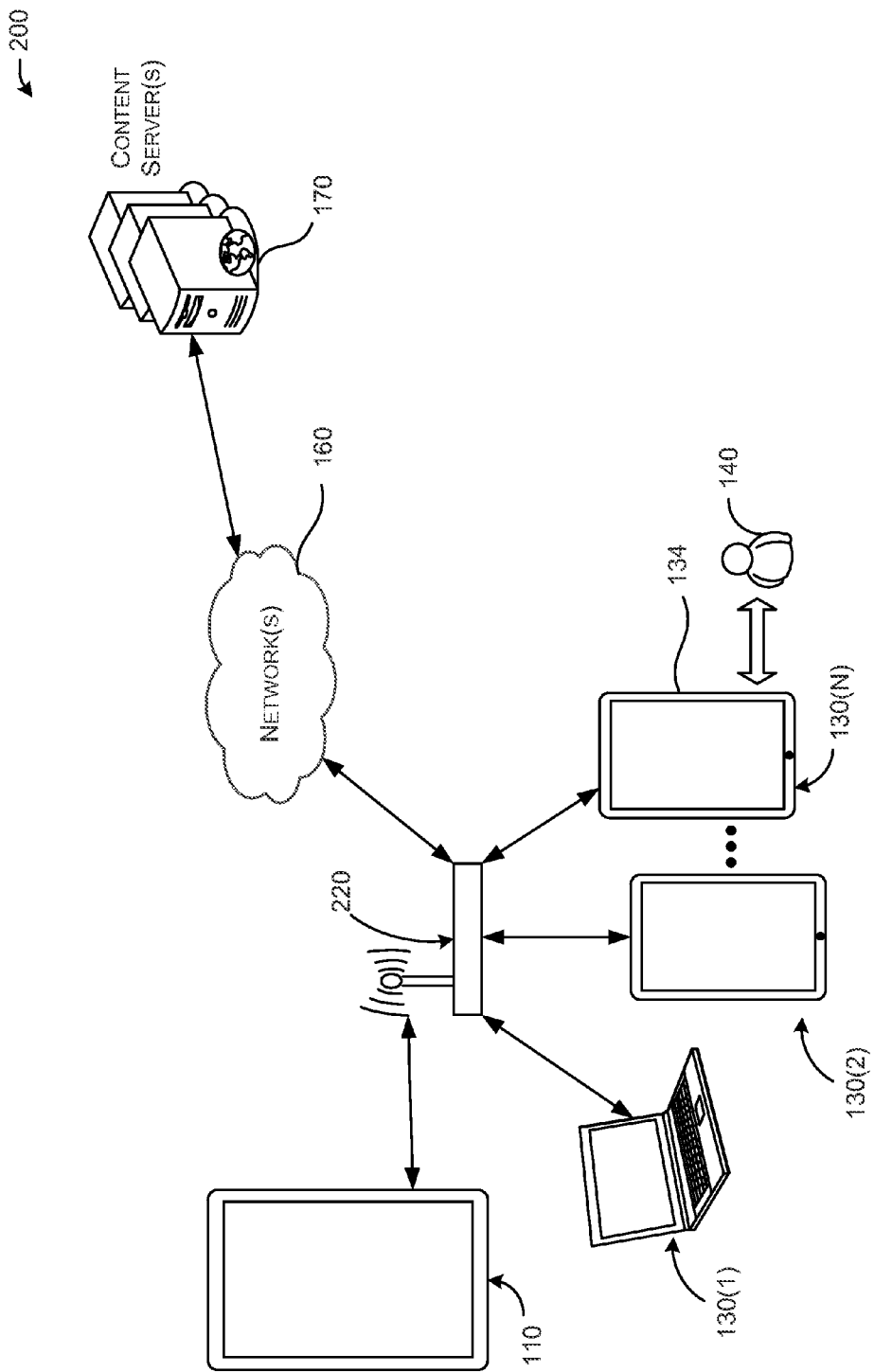
FIG. 2 is a schematic diagram that illustrates another use environment for transmitting and receiving a message, in accordance with example embodiments of the disclosure.
Figure 3:
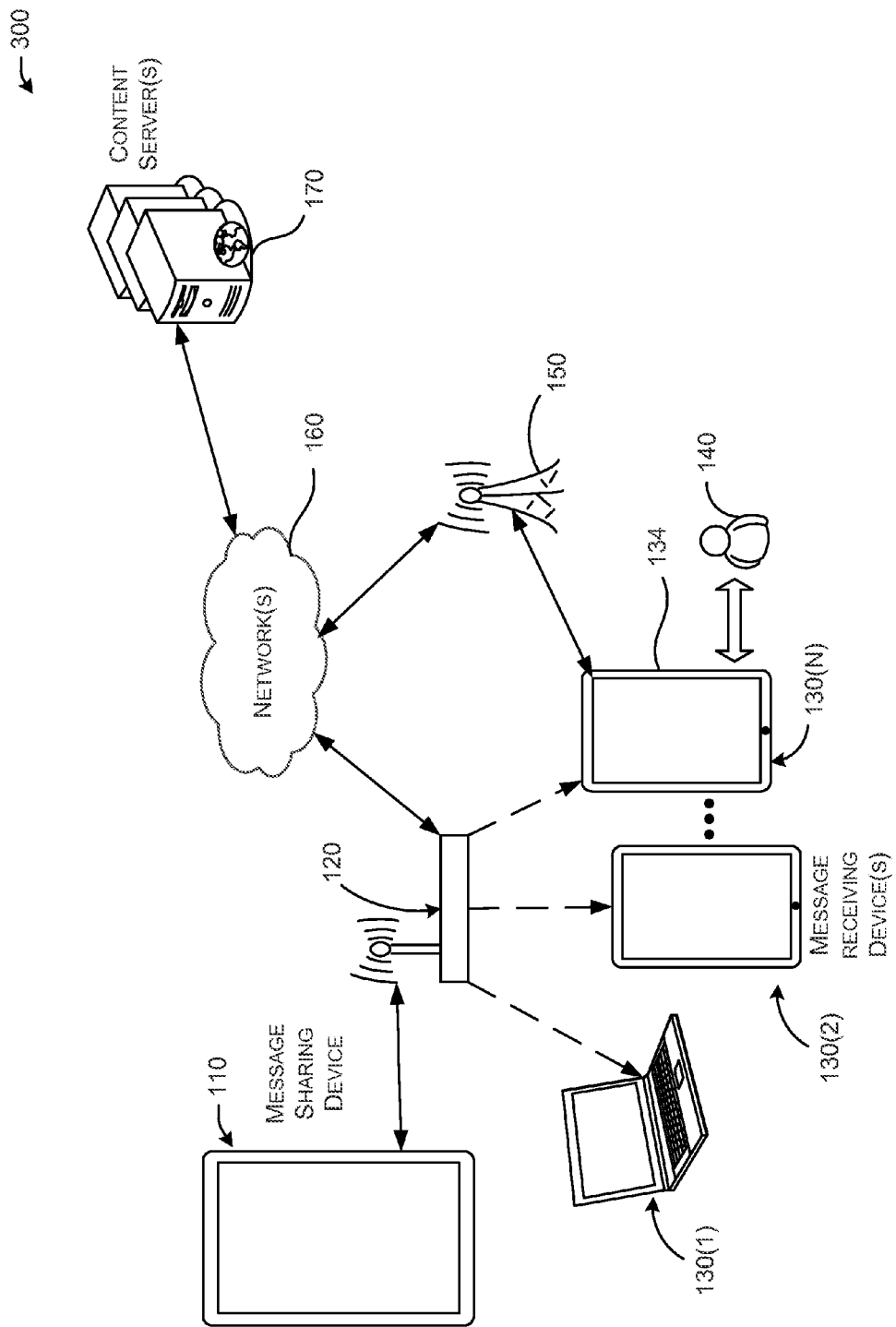
FIG. 3 is a schematic diagram that illustrates yet another use environment for transmitting and receiving a message, in accordance with example embodiments of the disclosure.

The concepts as discussed above may better be understood in reference to FIGS. 1-3. FIG. 1 is a schematic diagram that illustrates a use environment 100 for transmitting and receiving a message, in accordance with example embodiments of the disclosure. In certain example embodiments, there may be a message sharing device 110, such as a personal communication device, that may be configured to execute instructions and/or applications thereon that initiate a process for the message to be broadcast to other electronic devices, such as message receiving devices 130(1), 130(2), 130(N), hereinafter referred to individually or collectively as message receiving devices 130. This message may, in some cases, include a link to content on one or more networks 160, such as a wide area network (WAN) or the Internet. The link provided in the message may be a website or other content access location accessible via the networks 160 and served by one or more content servers 170.

The message receiving devices 130 may be configured to receive a beacon signal that is broadcast by the message sharing device 110, as depicted by either of the solid or dotted arrows between the message sharing device 110 and the message receiving devices 130, and determine therefrom if the beacon signal carries a message. In example embodiments the message receiving device 130 may have instructions and/or applications running thereon that enable it to determine if the received beacon signal indicates a message is carried thereon or if the beacon signal is an announcement of proximity of a message sharing device 110 or wireless access point. In certain cases, the received beacon signal may be identified as carrying the message based at least in part on symbols, bits, or other information carried by the beacon signal. For example, in some cases, a predetermined sequence of characters in a particular field of the beacon signal may indicate that the beacon signal carries a message.

The message receiving device 130 may further be configured to identify the message carried by a received beacon signal and render that message on the message receiving device 130, such as on a display screen 134, to a user 140 of the message receiving device 130. In certain example embodiments, the message may be rendered by the message receiving device 130 as images and/or video displayed on the display screen 134, sounds rendered on one or more speakers of the message receiving device 130, and/or vibrations rendered on one or more haptic output devices.

The message receiving device 130 may further be configured to communicate via one or more out-of-band channels, or otherwise communications links 150 and/or pathways other than through the message sharing device 110 to access the networks 160 and content servers 170 thereon, as shown for message sharing device 130(N). In certain example embodiments, these communications links 150 may be used by the message receiving devices 130 to access the one or more content servers 170 to retrieve content associated with a network address and/or link provided in a received message by the message receiving device 130. In certain example embodiments, and as depicted in FIG. 1 as the dotted connections between message receiving device 130 and the message sharing device 110, the message receiving devices 130 may not be communicatively coupled to the message sharing device 110 in a manner that enables the message receiving device 130 to access the networks 160 via the message sharing device 110. Instead, the message receiving devices 130 may be configured to access the networks via one or more out-of-band communicative links 150. In other example embodiments, as will be described in reference to FIGS. 2 and 3, the message receiving device 130 may be communicatively coupled to the networks via one or more entities, such as a base station that provides the message receiving device 130 with connectivity to the networks 160.

The message sharing device 110, while depicted as a tablet computing device, may be one of any variety of client devices, electronic devices, communications devices, and/or mobile devices. The message sharing device 110 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), or the like. Furthermore, the message receiving device 130 may be any suitable device and may be any one of the devices discussed above with relation to the message sharing device 110. Indeed, in some cases, the message receiving device 130 and the message sharing device 110 may be the same type of device.

The networks 170 may include any one of a combination of different types of suitable communications networks, such as cable networks, the Internet, wireless networks, cellular networks, and other private and/or public networks. Furthermore the networks 170 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements (e.g., set-top boxes, etc.), as well as in non-client/server arrangements (e.g., locally stored software applications, etc.).

In example embodiments of the disclosure, the one or more content servers 170 may include any computer(s) or server(s), including hardware and software, which are configured to provide network and/or Internet-based websites including one or more webpages or other content. In some cases, accessing content on the content servers 170 may involve authentication, such as by using access codes or login credentials. The content servers 170 may provide any suitable variety of content including, but not limited to, text, sound, haptics, olfactory, video, or combinations thereof. The content servers 170 may further be configured to provide a variety of content types, including news, information, entertainment, advertising, proprietary information, public domain information, social media feeds, government information, combinations thereof, or the like.

The communicative links 150 may enable communication with message receiving devices 130 using any suitable communication formats and/or protocols including, but not limited to, Wi-Fi, direct Wi-Fi, Bluetooth, 3G mobile communication, 4G mobile communication, long-term evolution (LTE), WiMax, direct satellite communications, or combinations thereof. The communicative links 150 may be configured to communicate with each other to receive and then retransmit information, such as data packets. A non-limiting example of this may be a cellular tower that relays communications from a message receiving device 130 to the networks 160 via one or more other cellular towers.

In this message sharing device 110, the message sharing device 110 may perform the functions of a base station or wireless access point. In other words, the message sharing device 110 may broadcast a beacon signal carrying a message that may be received by the message receiving devices 130. Therefore, the message receiving devices 130 may be able to determine the message based at least in part on the beacon signal transmitted by the message sharing device 110. The message sharing device 110 may be configured to provide communications services in ne or more protocols and/or standards, including Wi-Fi, BlueTooth (BT), and/or Wi-Fi direct, or other suitable communications protocols. In this case, the message sharing device 110 may be configured to incorporate a message onto a beacon signal, such as a Wi-Fi beacon signal, and broadcast the beacon signal. The beacon signal, as broadcast by the message sharing device 110, may be detected and/or received by the message receiving devices 130.

As shown, in some cases the message receiving device 130(1) may be communicatively coupled to the message sharing device 110 and may be configured to access the networks 160 via communications, Internet access point, and/or wireless router services provided by the message sharing device 110. In other cases, the message receiving device 130(N) may be communicatively coupled to the networks 160 via the out-of-band communicative link 150. In yet other cases, a message receiving device 130 may be configured to access the networks 160 and content servers 170 thereon via both the message sharing device 110 and an out-of-band communicative link 150. In this case, either or both pathways may be used by the message receiving device 130 to access any links and/or network addresses to content on the content servers 170. It will further be appreciated that any of the communicative links depicted herein may be wireline or wireless links.

Example embodiments of the disclosure may include configurations other than that depicted in FIG. 1. FIG. 2 is a schematic diagram that illustrates another use environment 200 for transmitting and receiving a message, in accordance with example embodiments of the disclosure. In this example environment 200, the message sharing device 110 may be configured, in certain example embodiments, to transmit the message, such as in the form of one or more data packets, to a base station 220 by any suitable mechanism, such as with a wired connection or a wireless connection and any suitable protocols. Applications running on the message sharing device 110 and/or base station 220 may establish a protocol and/or format with which the message may be transmitted between the message sharing device 110 and the base station 220.

The base station 220 may be configured to receive the message from the message sharing device 110 via one or more protocols established between the message sharing device 110 and the base station 220. The base station 220 may be configured to generate one or more beacon signals incorporating the message received from the message sharing device 110. The message may, in certain example embodiments, be limited in size, such as number of characters, so that it may fit on a beacon signal conforming to pre-existing protocols for broadcast beacon signals. For example, if using a Wi-Fi beacon signal is used, the message may be carried within the SSID field, or other pre-designated field of the beacon signal. The base station 220 may be configured to periodically transmit the generated beacon signal that carries the message thereon. The base station 220 may further transmit other beacon signals, such as network beacon signals to announce its presence and provide information for connecting to it. Further still, in certain example embodiments, a particular base station 220 may generate a corresponding respective beacon signal for each of more than one message and broadcast each of the beacon signals carrying each of the one or more messages.

In this example environment 200, unlike the example environment 100, the message receiving devices 130 may be communicatively coupled to the base station 220 and the base station 220 may provide the message receiving devices 130 access to the networks 160. As depicted here, the message receiving devices 130 are not connected to the networks 160 via the message sharing device 110 or out-of-band communicative links, such as communicative link 150 of FIG. 1.

The base station 220 may be configured to provide communication services via any suitable communicative mechanism and/or protocols, including, for example, the communications formats and/or protocols discussed with relation to the communicative links 150. In other words, the base stations may provide communications services via any one or more of Wi-Fi, direct Wi-Fi, Bluetooth, 3G mobile communication, 4G mobile communication, long-term evolution (LTE), WiMax, direct satellite communications, or combinations thereof.

In certain example embodiments, the base station 220 may be a Wi-Fi access point or a wireless router. In these embodiments, the communications protocols associated with the base station 220 may be defined by various sections of Institute of Electrical and Electronics Engineers (IEEE) 802.11 standards. These standards may include, but may not be limited to, communications via 2.4 GHz channels (e.g. 802.11b, 802.11g, 802.11n), 5 GHz channels (e.g. 802.11n, 802.11ac), or 60 GHZ channels (e.g. 802.11ad). These communications protocols may involve predefined beacons signals that may be of a fixed bit size and have predefined fields. These beacon signals may be broadcast by the base stations 220 to announce their availability to provide connectivity to the networks 160, in some cases, for a fee. In accordance with example embodiments of the disclosure, these beacon signals may be used to carry a message and thus broadcast the message to those devices, such as the message receiving devices 130 that are within radio range of the base station 220. Therefore, in some of these example embodiments, pre-established beacon signal formats may be modified to carry the message on the beacon signal. For example, the SSID field of the beacons signal may be modified to carry the message instead of the SSID of the base station 220.

FIG. 3 is a schematic diagram that illustrates yet another use environment 300 for transmitting and receiving a message, in accordance with example embodiments of the disclosure. In this environment 300, the message receiving devices 130 may not access the networks 160 via the base station 220. Therefore, in this case, the base station 220 may broadcast a beacon signal carrying the message that may be received by the message receiving devices 130, but may not provide network connectivity to the message receiving devices 130. It will be appreciated that in certain example embodiments, some of the message receiving devices 130 may access the networks 160 via the base station 220 and others of the message receiving devices 130 may access the networks 160 via an out-of-band communications path, such as communicative link 150. Of course, in some cases, a message receiving device 130 may be configured to access the networks 160 via both the base station 220 and an out-of-band communicative link 150.

Figure 4:
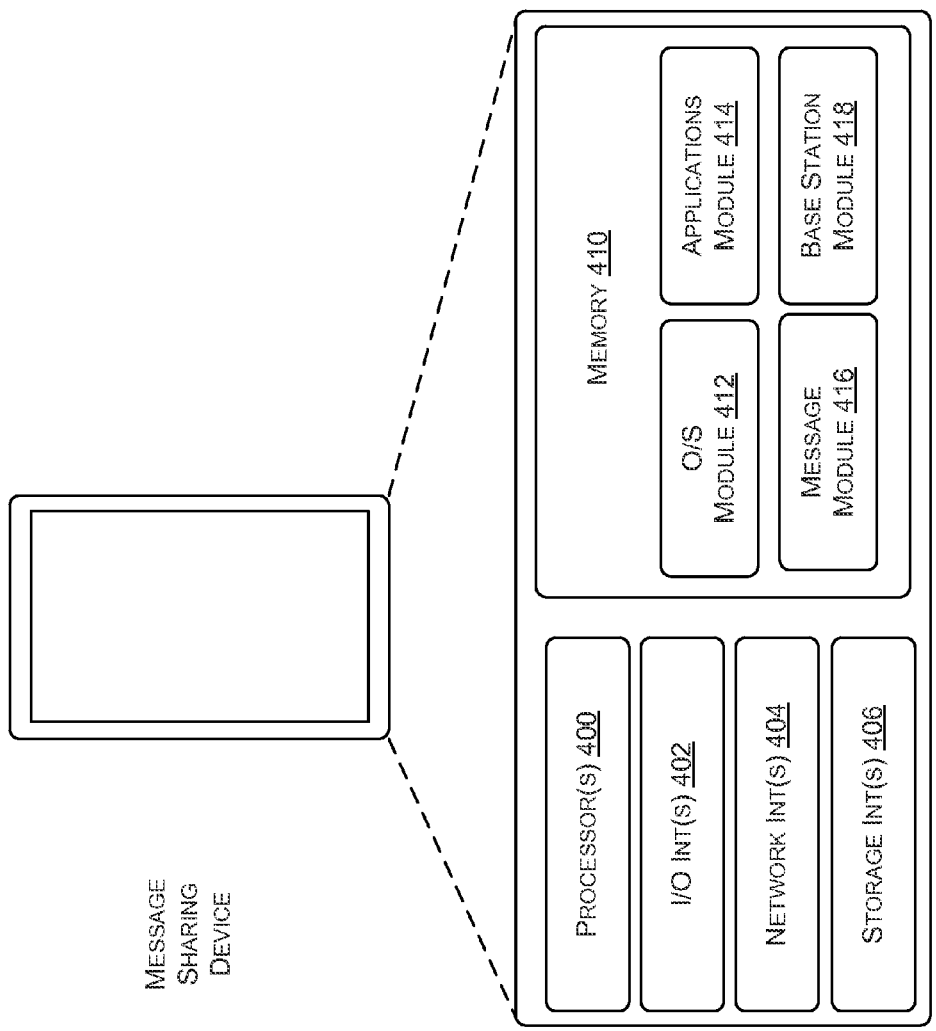
FIG. 4 is a block diagram illustrating an example message sharing device of the environments of any of FIGS. 1-3, in accordance with example embodiments of the disclosure.

FIG. 4 is a block diagram illustrating an example message sharing device of the environments of any of FIGS. 1-3, in accordance with example embodiments of the disclosure. The message sharing device 110 may include one or more processors 400, one or more I/O device interfaces 402, one or more network interface(s) 404, one or more storage interface(s) 406, and one or more memories 410.

In some examples, the processors 400 of the message sharing device 110 may be implemented as appropriate in hardware, software, firmware, or combinations thereof. Software or firmware implementations of the processors 400 may include computer-executable or machine-executable instructions written in any suitable programming language to perform the various functions described. Hardware implementations of the processors 220 may be configured to execute computer-executable or machine-executable instructions to perform the various functions described. The one or more processors 220 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The imaging system 220 may also include a chipset (not shown) for controlling communications between the one or more processors 220 and one or more of the other components of the imaging system 220. The one or more processors 220 may also include one or more application specific integrated circuits (ASICs) or application specific standard products (ASSPs) for handling specific data processing functions or tasks.

The input/output (I/O) device(s) such as the touch sensitive display screen(s), speaker(s), haptic device(s), or the like, may be controlled via the one or more I/O device interfaces 402. The network interfaces(s) 404 may allow the message sharing device 110 to communicate via network 160 and/or via other communicative channels, such as via base station 220. The message sharing device 110 may, therefore, be configured to access one or more remote servers, cloud servers, and/or cloud storage resources via the networks 160. The storage interface(s) 406 may enable the message sharing device 110 to receive and interpret signals from the one or more storage devices (not shown).

The memory 410 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 410 may store program instructions that are loadable and executable on the processor(s) 400, as well as data generated or received during the execution of these programs. Turning to the contents of the memory 400 in more detail, the memory 400 may include one or more operating systems (O/S) 412, an applications module 414, a message module 416, and a base station module 418. Each of the modules and/or software may provide functionality for the message sharing device 110, when executed by the processors 400. The modules and/or the software may or may not correspond to physical locations and/or addresses in memory 410. In other words, the contents of each of the modules 412, 414, 416, 418 may not be segregated from each other and may, in fact be stored in at least partially interleaved positions on the memory 410.

The O/S module 412 may have one or more operating systems stored thereon. The processors 400 may be configured to access and execute one or more operating systems stored in the (O/S) module 412 to operate the system functions of the message sharing device 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® 05-X®, or the like.

The application(s) module 414 may contain instructions and/or applications thereon that may be executed by the processors 400 to provide one or more services. These instructions and/or applications may, in certain aspects, interact with the (O/S) module 412 and/or other modules of the message sharing device 110. The applications module 414 may have instructions, software, and/or code stored thereon that may be launched and/or executed by the processors 400 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In certain embodiments, the applications that are stored in the applications module 414 and executable by the processors 400 may provide services for sharing a message with a base station 220 and/or message receiving devices 130.

The instructions and/or functionality stored in the message module 416 may be executed by the processors 400 to provide a variety of messaging functionality of the message sharing device 110. The processors 400 may be configured to receive input, such as user input, of one or more messages that are to be broadcast to message receiving devices 130. The processors 400 may be configured, by executing instructions stored in the message module 416, to solicit from a user, such as via one or more I/O devices, a message. In certain example embodiments, the processors 400 may be configured to determine if the received message is in compliance for sharing via the protocols and/or formats of the environment 100, 200, 300. For example, the message sharing device 110 and the processors 400 thereon may be configured to determine if the message to be broadcast is compliant for length within the constraints of the beacon signals. In other words, the processors 400 may be configured to determine and provide feedback if the message as received by user input to the message sharing device is too long to incorporate into a beacon frame that may be used for broadcast of the message by the message sharing device 110 and/or the base station 220. After receiving the message, such as by user input, the processors 400 may be configured to provide the message to the base station 220 or other components within the message sharing device 110 that may provide similar functions as the base station 220. In some cases, the message sharing device 110 may modify the message as provided to it for the purposes of subsequent broadcast.

The instructions and/or functionality stored in the base station module 418 may be executed by the processors 400 to enable a variety of interactions with the base station 220 and/or provide similar functionality as the base station 220. In one aspect, the processors 400 may be configured to format the received message in an appropriate format to transmit to the base station. The message may be transmitted in any suitable format including, but not limited to, base 64 format, extensible markup language (XML) format, and/or American Standard Code for Information Interchange (ASCII) format. In another aspect, the message may be transmitted to the base station 220 in the form of one or more data packets and in a pre-established protocol between the base station 220 and the message sharing device 110.

In certain example embodiments, the base station module 418 may have instructions stored thereon that may enable the processors 400 and the message sharing device 110 to provide various functions associated with transmitting a beacon signal carrying the message. In one aspect, the processors 400 may be configured to determine if the received message conforms to limits associated with the incorporation onto the beacon signal. This may result in a size limit, length limit, and/or a number of character limit on the message. For example, if the message is to be incorporated onto the SSID data field of the beacon signal, then the size may be a maximum of 32 bytes. In another aspect, the processors 400 may be configured to incorporate the message into one or more fields of the beacon signal. The incorporation of the message may be, for example, in the SSID field of the beacon signal. In yet further embodiments, the processors 400 may incorporate an indication that the beacon signal carries a message onto one or more data fields of the beacons signal. This may be performed by providing a predetermined sequence of bits, symbols, and/or characters within one or more data fields of the beacon signal. In some example cases, this sequence may be incorporated in the same data field of the beacon signal that carries the message. In other example cases, the indicator that the beacon signal carries a message may be incorporated in a different data field of the beacon signal than the data field that carries the message. It will be appreciated that this indicator that the beacon signal carries a message may be used by the message receiving device 130 to determine that the received beacon signal carries a message, rather than an announcement of an available network access point.

The processors 400, by executing instructions stored in the base station module 418 may further be configured to broadcast the beacons signal. The broadcast of the beacon signal may be repeated on a periodical basis, such as, for example, approximately every 100 milliseconds (ms). The processors 400 may also be configured to receive, such as via WO devices of the message sharing device 110, an indication of when to stop repeatedly transmit the beacon signal. It will be appreciated that there may be a trade-off between the frequency of broadcast of the beacon signal and the power usage on the message sharing device 110. This may particularly be considered if the message sharing device is portable and/or operates using a battery power source. In these example cases, the processors may modulate the frequency of broadcast based at least in part on power usage considerations. For example, there may be a greater frequency of broadcast when the message sharing device 110 is in an active mode, instead of a stand-by and/or sleep mode.

It will be appreciated that there may be overlap in the functionality of the instructions stored in the one or more operating systems (O/S) module 412, the applications module 414, the message module 416, and the base station module 418. In fact, the functions of the aforementioned modules 412, 414, 416, 418 may interact and cooperate seamlessly under the framework of the message sharing device 110. Indeed, each of the functions described for any of the modules 412, 414, 416, 418 may be stored in any module 412, 414, 416, 418 in accordance with certain example embodiments of the disclosure. Further, in certain example embodiments, there may be one single module that includes the instructions, programs, and/or applications described within the operating systems (O/S) module 412, the applications module 414, the message module 416, and the base station module 418.

Figure 5:
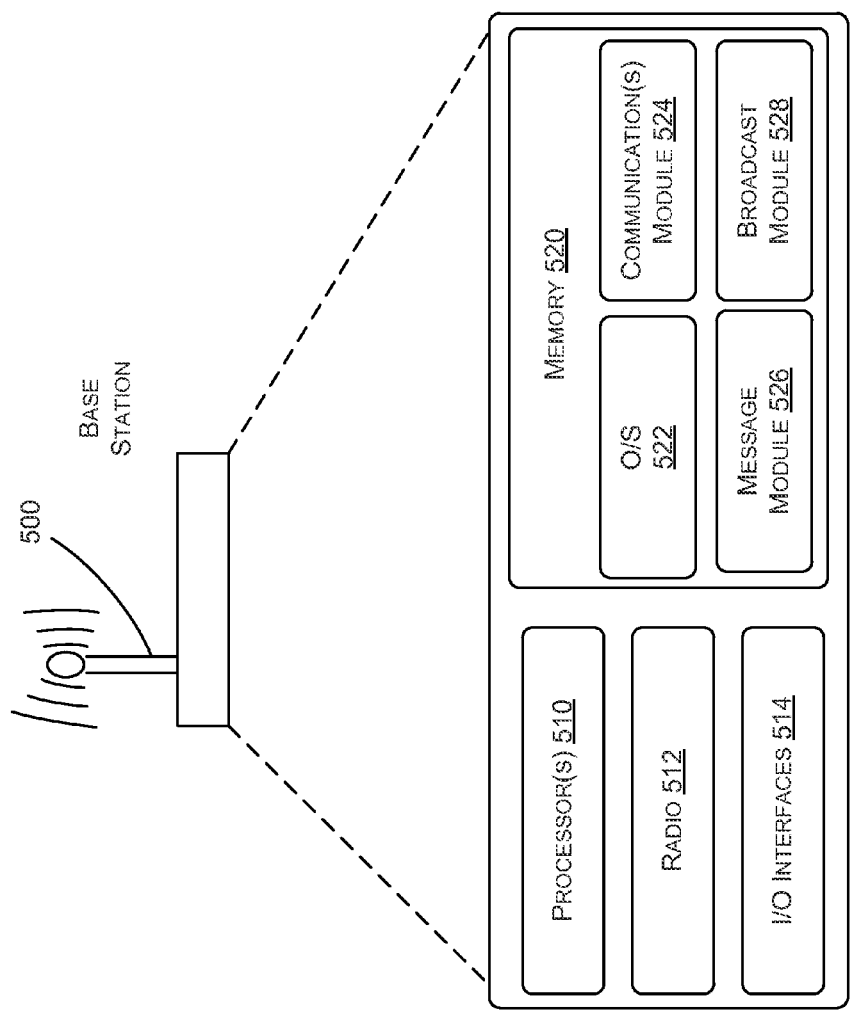
FIG. 5 is a block diagram illustrating an example base station of the environments of any of FIGS. 1-2, in accordance with example embodiments of the disclosure.

FIG. 5 is a block diagram illustrating the example base station 220 of the environments 100, 200 of any of FIGS. 1-2, in accordance with example embodiments of the disclosure. The base station 220 may include a communications antenna 500, one or more processors 510, one or more radios 512, one or more I/O device interfaces 514 and one or more memories 520. The processors 510, I/O interfaces 514, and one or more memories 520 may be similar to the processors 400, I/O interfaces 402, and the one or more memories 410, respectively, of the message sharing device 110, as described in reference to FIG. 4, and in the interest of brevity, the description of these elements will not be repeated here.

The communications antenna 500 may be any suitable type of antenna corresponding to the communications protocols used by the base station 220. Some non-limiting examples of suitable communications antennas 500 include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna 500 may be communicatively coupled to the one or more radio(s) 512 to transmit and/or receive signals, such as communications signals and/or beacon signals.

The transmit/receive or radios 512 may include any suitable radio for transmitting and/or receiving radio frequency (RF) signals in the bandwidth and/or channels corresponding to the communications protocols utilized by the base station 220 to communicate with, provide connectivity to, and/or broadcast beacon signals to other devices. The radio 512 may include hardware and/or software to modulate communications signals according to pre-established transmission protocols. The radio 512 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radio 512, in cooperation with the communications antennas 500, may be configured to communicate via 2.4 GHz channels (e.g. 802.11b, 802.11g, 802.11n), 5 GHz channels (e.g. 802.11n, 802.11 ac), or 60 GHZ channels (e.g. 802.11 ad). In alternative embodiments, non-Wi-Fi protocols may be used for communications between adjacent base station 220, such as Bluetooth, dedicated short-range communication (DSRC), or other packetized radio communications. The radio 512 may include any known receiver and baseband suitable for communicating via the communications protocols of base station 220. The radio component may further include a low noise amplifier (LNA), additional signal amplifiers, an analog-to-digital (A/D) converter, one or more buffers, and digital baseband.

The memory 520 may store program instructions that are loadable and executable on the processor(s) 510, as well as data generated or received during the execution of these programs. Turning to the contents of the memory 520 in more detail, the memory 520 may include one or more operating systems (O/S) 522, a communications module 524, a message module 526, and a broadcast module 528. Each of the modules and/or software may provide functionality for the base station 220, when executed by the processors 510. The modules and/or the software may or may not correspond to physical locations and/or addresses in memory 520. In other words, the contents of each of the modules 522, 524, 526, 528 may not be segregated from each other and may, in fact be stored in at least partially interleaved positions on the memory 520. The O/S module 522 may be similar to the O/S module 412 of the message sharing device 110 as described with reference to FIG. 4 and, therefore, in the interest of brevity, the description of the O/S module 522 will not be repeated here.

The instructions stored in the communications module 524 may be executed by the processors 510 to perform various functions associated with communications services provided by the base station 220. The processors 510 may be configured to generate and broadcast beacons signal that indicate the presence of the base station 220 and the services associated with the base station 220. In certain example embodiments, the base station 220 may be configured to broadcast a beacon signal to advertise a particular SSID associated with a basic service set (BSS) or extended service set (ESS) with which the base station 220 is associated. The base station may further be configured to broadcast beacon signals on a periodic basis to indicate the presence of the base station 220 and a BSS and/or ESS associated therewith. The processors may further be configured to perform handshaking procedures with other devices, such as message receiving devices 130 and/or message sharing devices 110. Therefore, the base station 220 may be configured to associate and/or pair with one or more message receiving devices 130 and/or message sharing devices 110 and provide communications services, such access to the networks 160 to the paired device(s). It should be noted that in certain example embodiments of the disclosure, the processors 510 and the base station 220 may be configured to broadcast one or more beacon signals directed to announcing a BSS and/or ESS while broadcasting one or more other beacon signals carrying a message.

The instructions and/or functionality stored in the message module 526 may be executed by the processors 510 to enable a variety of interactions with the message sharing device 110. In one aspect, the processors 510 may be configured to receive the message to be broadcast form the message sharing device 110. In another aspect, the processors 510 may be configured to format the received message in an appropriate format to incorporate into the beacon signal. The message may be incorporated in the beacon signal in any suitable format including, but not limited to, base64 format, XML format, and/or ASCII format. In another aspect, the message may be received from the message sharing device 110 in the form of one or more data packets and in a pre-established protocol between the base station 220 and the message sharing device 110.

In certain example embodiments, the message module 526 may have instructions stored thereon that may enable the processors 510 and the base station 220 to provide various functions associated with transmitting a beacon signal carrying the message. In one aspect, the processors 510 may be configured to determine if the received message conforms to limits associated with the incorporation onto the beacon signal. This may result in a size limit, length limit, and/or a number of character limit on the message. For example, if the message is to be incorporated onto the SSID data field of the beacon signal, then the size may be a maximum of 32 bytes. In another aspect, the processors 510 may be configured to incorporate the message into one or more fields of the beacon signal. The incorporation of the message may be, for example, in the SSID field of the beacon signal. In yet further embodiments, the processors 510 may incorporate an indication that the beacon signal carries a message onto one or more data fields of the beacons signal. This may be performed by providing a predetermined sequence of bits, symbols, and/or characters within one or more data fields of the beacon signal. In some example cases, this sequence may be incorporated in the same data field of the beacon signal that carries the message. In other example cases, the indicator that the beacon signal carries a message may be incorporated in a different data field of the beacon signal than the data field that carries the message. It will be appreciated that this indicator that the beacon signal carries a message may be used by the message receiving device 130 to determine that the received beacon signal carries a message, rather than an announcement of an available network access point.

The processors 510, by executing instructions stored in the broadcast module 528 may further be configured to broadcast the beacons signal, such as beacon signals carrying the message. The broadcast of the beacon signal may be repeated on a periodical basis, such as, for example, approximately every 100 ms. The processors 510 may also be configured to receive, such as from the message sharing device 110, an indication of when to stop repeatedly transmitting the beacon signal.

It will be appreciated that there may be overlap in the functionality of the instructions stored in the one or more operating systems (O/S) module 522, the communications module 524, the message module 526, and the broadcast module 528. In fact, the functions of the aforementioned modules 522, 524, 526, 528 may interact and cooperate seamlessly under the framework of the base station 220. Indeed, each of the functions described for any of the modules 522, 524, 526, 528 may be stored in any module 522, 524, 526, 528 in accordance with certain example embodiments of the disclosure. Further, in certain example embodiments, there may be one single module that includes the instructions, programs, and/or applications described within the operating systems (O/S) module 522, the communications module 524, the message module 526, and the broadcast module 528.

Figure 6:
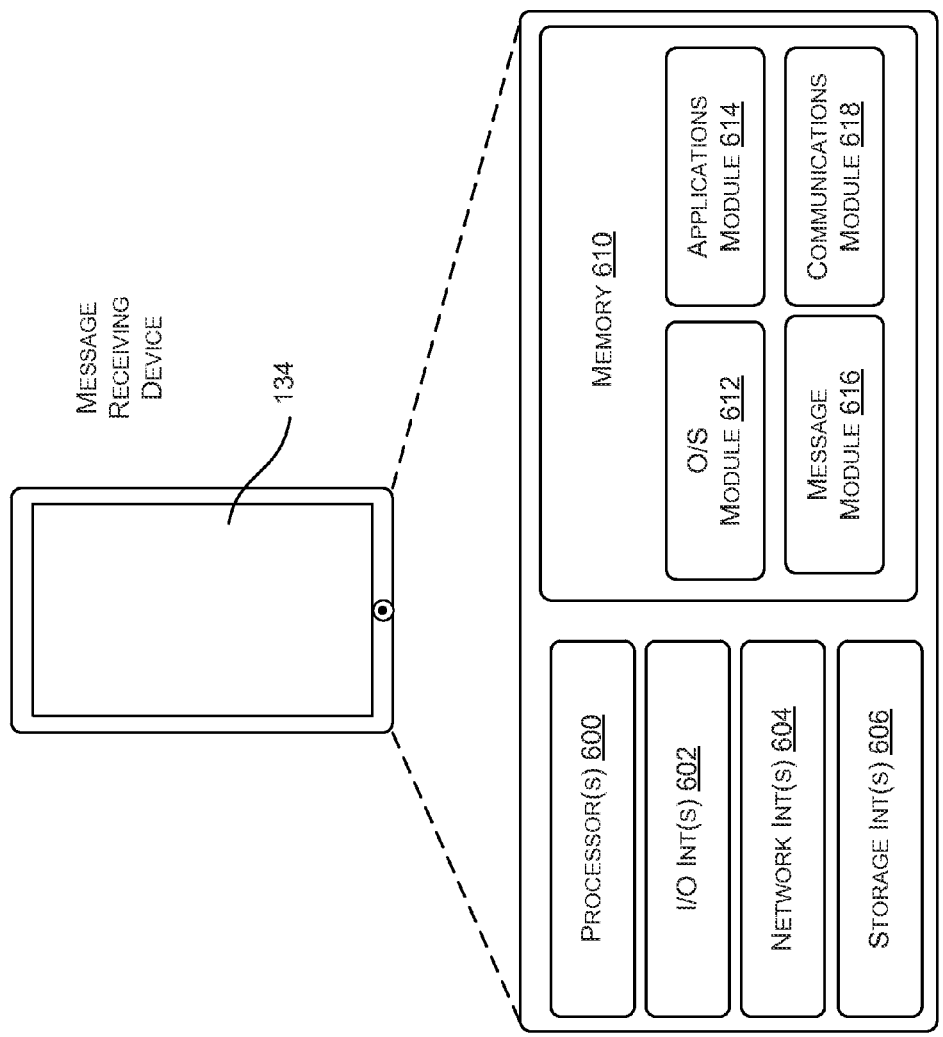
FIG. 6 is a block diagram illustrating an example message receiving device of the environments of any of FIGS. 1-3, in accordance with example embodiments of the disclosure.

FIG. 6 is a block diagram illustrating an example message receiving device 130 of the environments 100, 200, 300 of any of FIGS. 1-3, in accordance with example embodiments of the disclosure. The message receiving device 130 may include one or more processors 600, one or more I/O device interfaces 602, one or more network interface(s) 604, one or more storage interface(s) 606, and one or more memories 610. The processors 600, I/O interfaces 602, network interface(s) 604, storage interface(s) 606, and one or more memories 610 may be similar to the processors 400, I/O interfaces 402, network interface(s) 404, storage interface(s) 406, and the one or more memories 410, respectively, of the message sharing device 110, as described in reference to FIG. 4, and in the interest of brevity, the description of these elements will not be repeated here.

The memory 610 may store program instructions that are loadable and executable on the processor(s) 600, as well as data generated or received during the execution of these programs. Turning to the contents of the memory 610 in more detail, the memory 610 may include one or more operating systems (O/S) 612, application module 614, a message module 616, and a communications module 618. Each of the modules and/or software may provide functionality for the message receiving device 130, when executed by the processors 600. The modules and/or the software may or may not correspond to physical locations and/or addresses in memory 610. In other words, the contents of each of the modules 612, 614, 616, 618 may not be segregated from each other and may, in fact be stored in at least partially interleaved positions on the memory 520. The O/S module 612 and applications module 614 may be similar to the O/S module 412 and applications module 414 of the message sharing device 110, as described with reference to FIG. 4, and, therefore, in the interest of brevity, the description of the O/S module 612 and the applications module 614 will not be repeated here.

The instructions and/or functionality stored in the message module 616 may be executed by the processors 600 to enable a variety of functions associated with receiving a message that is broadcast via a beacon signal by either or both of the message sharing device 110 and/or base station 220. The message may be incorporated in the beacon signal in any suitable format including, but not limited to, base64 format, XML format, and/or ASCII format. In one aspect, the processors 600 may be configured to receive the beacon signal. In another aspect, the processors 600 may be configured to identify that the beacon signal carries a message. In yet another aspect, the processors 600 may be configured to identify the message carried by the received beacon signal.

In certain example embodiments, the message module 616 may have instructions stored thereon that may enable the processors 600 and the message receiving device 130 to provide various functions associated with receiving a beacon signal carrying the message. In one aspect, the processors 600 may be configured to parse one or more data fields, such as the SSID data field, of the beacon signal to determine if the beacon signal includes a message. In this case, the processors may search for a sequence and/or string of characters that may indicate that the beacon signal carries a message. In some example cases, this sequence may be incorporated in the same data field of the beacon signal that carries the message. In other example cases, the indicator that the beacon signal carries a message may be incorporated in a different data field of the beacon signal than the data field that carries the message. In another aspect, the processors 600 may be configured to identify and/or extract the message from one or more fields of the received beacon signal. The extraction of the message may be, for example, from the SSID field of the beacon signal. The message receiving device 130 may be configured to render the message to the user 140, such as on the display screen 134 of the message receiving device or other suitable I/O device(s).

It will be appreciated that the processors 600 and the message receiving device 130 may be configured to "listen" for the beacon signals on a periodic basis. For example, the message receiving device may be in a state to detect the beacon signal every approximately 0.5 second for a duration of approximately 50 ms. Therefore, the message receiving device may not detect a beacon signal every time a beacon signal is broadcast by the message sharing device 110 and/or base station 220. It will be appreciated that there may be a trade-off between the frequency of detecting of the beacon signal and the power usage on the message receiving device 130. This may particularly be considered if the message receiving device 130 is portable and/or operates using a battery power source. In these example cases, the processors 600 may be configured to modulate the frequency of "listening" of the beacon signal based at least in part on power usage considerations. For example, there may be a greater frequency and intervals of detection used when the message receiving device 130 is in an active mode, instead of a stand-by and/or sleep mode. Furthermore, the message receiving device 130 may, in certain example cases, continuously listen for the beacon signals, such as when the user 140 may request the same.

The instructions stored in the communications module 618 may be executed by the processors 600 to perform various functions associated with communications services of the message receiving device. The processors 600 may be configured to detect, utilize, and/or pair with one or more vectors for accessing the networks 160, such as the message sharing device 110, base station 220, and/or the out-of-band communications link 150. The processors 600 may further be configured to identify one or more links and/or network addresses provided in the received message. The processors may utilize one or more communicative links to the networks 160 to access and/or retrieve the content associated with the network address, such as from the content servers 170.

It will be appreciated that there may be overlap in the functionality of the instructions stored in the one or more operating systems (O/S) module 612, the applications module 614, the message module 616, and the communications module 618. In fact, the functions of the aforementioned modules 612, 614, 616, 618 may interact and cooperate seamlessly under the framework of the message receiving device 130. Indeed, each of the functions described for any of the modules 612, 614, 616, 618 may be stored in any module 612, 614, 616, 618 in accordance with certain example embodiments of the disclosure. Further, in certain example embodiments, there may be one single module that includes the instructions, programs, and/or applications described within the operating systems (O/S) module 522, the applications module 614, the message module 616, and the communications module 618.

Illustrative Processes

Figure 7:
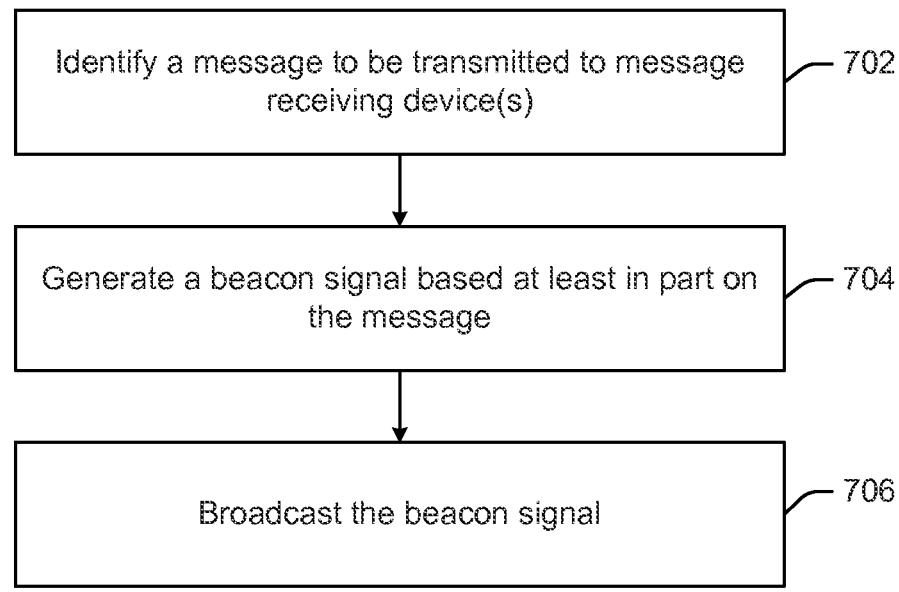
FIG. 7 is an example flow diagram illustrating an example method for sharing messages by the message sharing device of FIG. 4, in accordance with example embodiments of the disclosure.

FIG. 7 is a flow diagram illustrating an example method 700 for broadcasting a beacon signal carrying a message by the message sharing device 110 of FIG. 4 to one or more message receiving devices 130, in accordance with example embodiments of the disclosure. At block 702, a message to be broadcast to message receiving device(s) may be identified. This message may be received and/or solicited by user input on the message sharing device 110. Alternatively the first message may be stored on the message sharing device 110 memory 410, such as in a queue of messages to be broadcast by the message sharing device 110.

At block 704, a beacon signal may be generated based at least in part on the message. The beacon signals may include the message. The beacon signals may be constructed by incorporating the message into a pre-existing standard beacon signal for an existing protocol, such as Wi-Fi, Wi-Fi direct, or Bluetooth. In certain example embodiments, the beacon signal may be generated by incorporating the message into an SSID data field of the beacon signal.

At block 706, the beacon signal may be broadcast. It will be appreciated that the beacon signal carrying the message may be broadcast periodically, such as with a period in the range of about 50 ms to about 1 s. It will also be appreciated that the message sharing device 110 may transmit one or more other beacons such as network beacons to indicate the presence of an AP access point or tether point via Wi-Fi, Bluetooth, and/or Wi-Fi direct services provided by the message sharing device 110.

Figure 8:
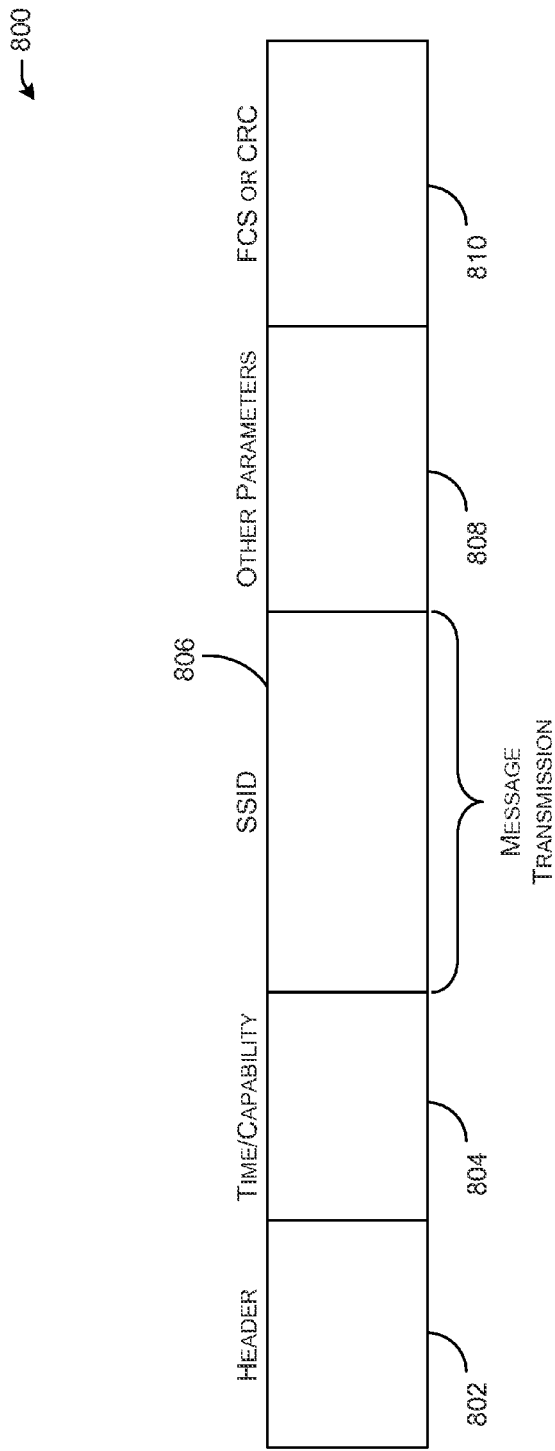
FIG. 8 is a diagram illustrating example fields of a beacon signal used for messaging, in accordance with example embodiments of the disclosure.

FIG. 8 is a diagram illustrating example fields 802, 804, 806, 808, 810 of a beacon signal 800 used for messaging, in accordance with example embodiments of the disclosure. This beacon signal 800 may be similar to beacon signals used in Wi-Fi, but may be used with any suitable protocol and/or format of message broadcasting. Each of the fields may include one or more bits of data. In example embodiments, the header field 802 may include a media access control (MAC) header. The time/capability field 804 may include timestamps or time synchronization data, beacon interval data, and information about capability and/or types of services offered. The SSID field 806 may generally carry an identification of the BSS and/or ESS. In one sense, this may be the "name" of the wireless network. The other parameters field 808 may include information about channels, frequencies, contention, or the like. The FCS/CRC field may provide transmission integrity check information of the beacon signal 800, such as a cyclic redundancy check (CRC) and/or a frame check sequence (FCS). In certain example embodiments of the disclosure, the beacon signal 800 may be modified to carry the message, such as by the message sharing device 110 and/or the base station 220. In some example cases, the message may be carried in the SSID field 806. The SSID field 806 may have a size limit, such as, for example, 32 bytes. Therefore, in example embodiments, the message size carried by the beacon signal may be constrained by the size of the SSID field 806. For example, in some cases, the maximum message size may be 32 bytes. This, in an example embodiment using base64 encoding or ASCII encoding, may correspond to a maximum message size of about 32 characters. It will also be appreciated that in certain further example embodiments, non-text based messages may be carried by the beacon signal.

Figure 9:
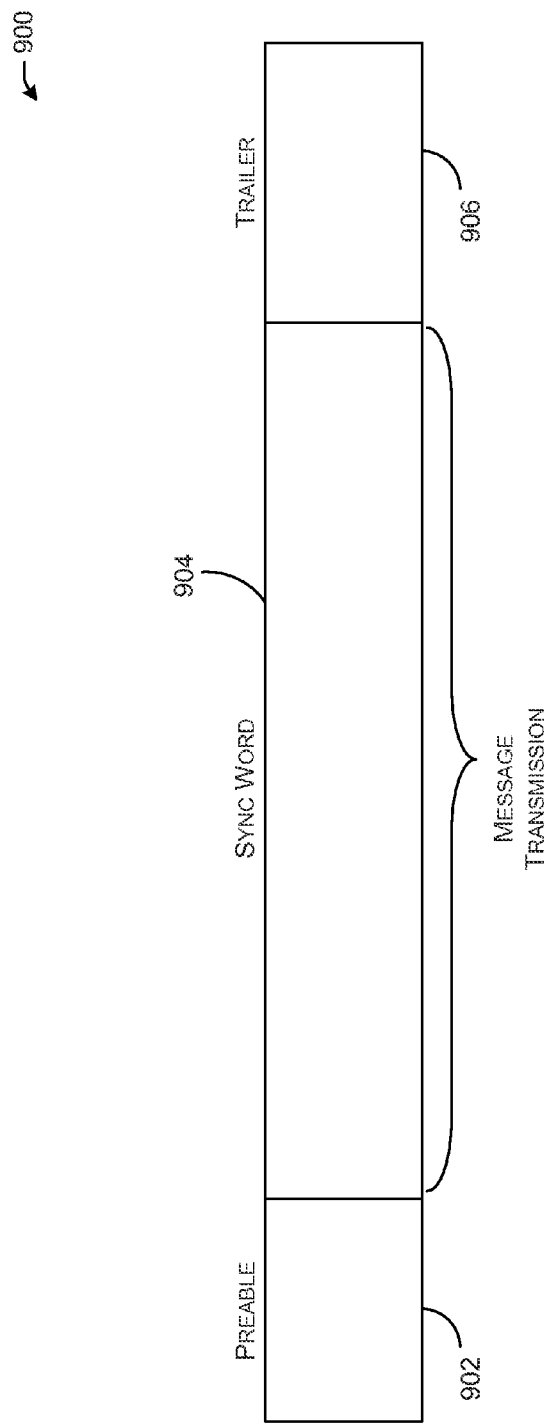
FIG. 9 is a diagram illustrating example fields of another example beacon signal used for messaging, in accordance with example embodiments of the disclosure.

FIG. 9 is a diagram illustrating example fields 902, 904, 906 of a beacon signal 900 used for messaging, in accordance with example embodiments of the disclosure. This beacon signal 900 may be similar to a Bluetooth beacon signal, with a preamble field 902, a sync word field 904, and/or a trailer field 906. In this beacon signal 900, the message may be incorporated in and carried by any of the fields, such as the sync word field 904. In certain example embodiments, the beacon signal 900 may be limited to 68 bits of length and, therefore, a message carried by the beacon signal 900 may be limited in length by the total bit length of the beacon signal 900.

Figure 10:
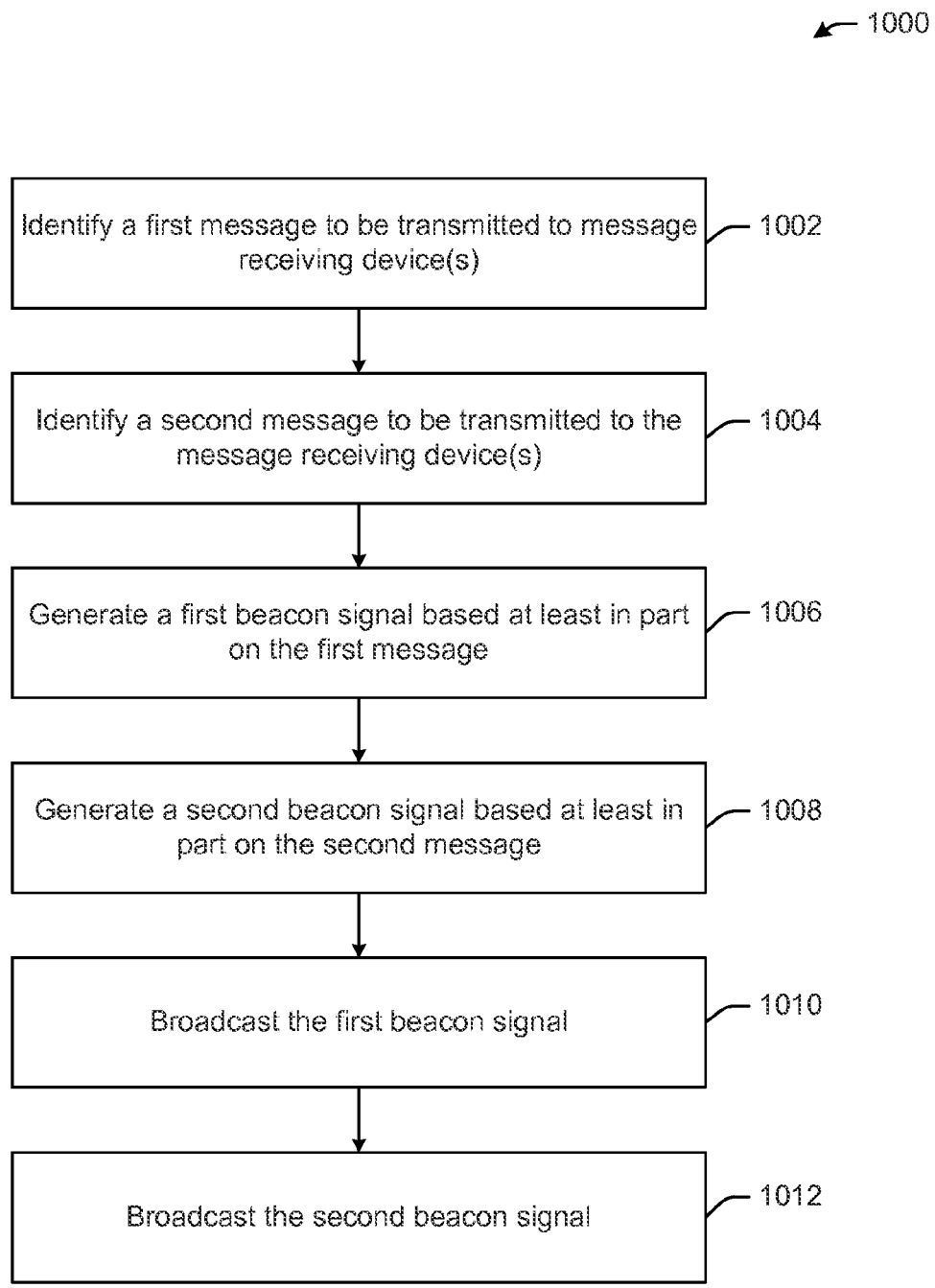
FIG. 10 is a flow diagram illustrating an example method for sharing more than one message by the message sharing device of FIG. 4, in accordance with example embodiments of the disclosure.

FIG. 10 is a flow diagram illustrating an example method 1000 for sharing messages by the message sharing device 110 of FIG. 4, in accordance with example embodiments of the disclosure. This method 1000 may be performed by the message sharing device 110 in cooperation with one or more entities of environments 100, where the message sharing device 110 itself may generate and broadcast a beacon signal carrying the message to be broadcast to the message receiving devices 130. Furthermore, this method 1000 provides for two different messages to be broadcast by the message sharing device 110 to message receiving devices 130.

At block 1002, a first message to be broadcast to message receiving device(s) may be identified. This message may be received and/or solicited by user input on the message sharing device 110. Alternatively the first message may be stored on the message sharing device 110 memory 410. At block 1004, a second message to be broadcast to message receiving device(s) may be identified. Either or both of the first and second messages may be received and/or solicited using processes similar to those described in reference to block 702 of method 700 of FIG. 7.

At block 1006, a first beacon signal may be generated based at least in part on the first message. At block 1008, a second beacon signal may be generated based at least in part on the second message. Each of the first and second beacon signals may include the first and second messages, respectively. The beacon signals may be constructed by incorporating the first or second message into a pre-existing standard beacon signal for an existing protocol, such as Wi-Fi direct. In certain example embodiments, the first and second beacon signals may be generated by incorporating the first and second message into the SSID data field of the beacon signal.

At block 1010, the first beacon signal may be broadcast. At block 1012, the second beacon signal may be broadcast. It will be appreciated that these beacon signals, carrying the first and second messages may be broadcast periodically, such as with a period in the range of about 50 ms to about 1 s. It will also be appreciated that the message sharing device 110 may transmit one or more other beacons such as network beacons to indicate the presence of an AP access point or tether point via Wi-Fi and/or Wi-Fi direct services provided by the message sharing device 110.

It will be appreciated that the method 1000 may be utilized in example embodiments to transmit two messages when a single message broadcast may not be sufficient to convey all the information that is desired to be broadcast. Therefore, the information two be broadcast may be separated into two messages. It will also be appreciated that in certain example embodiments, there may be more than two messages. Indeed, the message sharing device 110 and/or the base station 220 may be configured to broadcast any plurality of messages carried by a corresponding respective beacon signal. Other use cases of method 1000 may be when a link and/or network address to content and a corresponding authentication credential, such as a password, is to be broadcast, the content network address and the authentication credentials may be broadcast separately.

It should be noted that the method 1000 may be modified in various ways in accordance with certain embodiments. For example, one or more operations of the method 800 may be eliminated or executed out of order in other embodiments. Additionally, other operations may be added to the method 800 in accordance with other embodiments.

Figure 11:
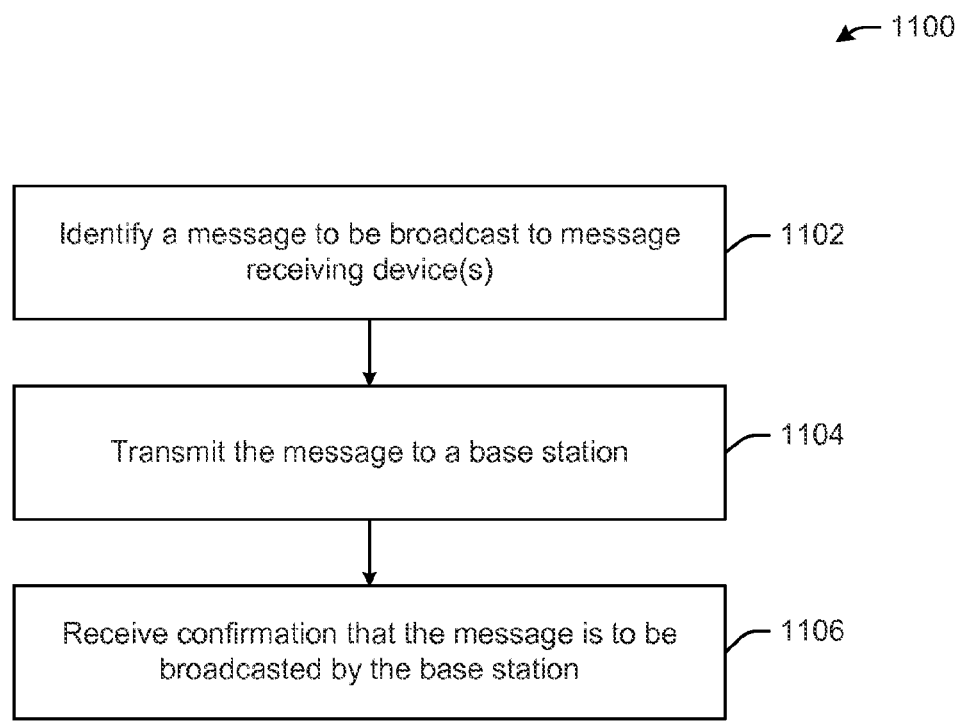
FIG. 11 is a flow diagram illustrating an example method for providing a message by the message sharing device of FIG. 4 to the base station of FIG. 5, in accordance with example embodiments of the disclosure.

FIG. 11 is a flow diagram illustrating an example method 1100 for providing a message by the message sharing device 110 of FIG. 4 to the base station 220 of FIG. 5, in accordance with example embodiments of the disclosure. This method 1100 may be performed when the message to be broadcast to the message receiving devices 130 is to be identified on the message sharing device 110 and broadcast, as part of a beacon signal, by the base station 220.

At block 1102, a message to be broadcast to message receiving devices may be identified. This message may, in certain example embodiments, be received by the message sharing device 110 from input from a user of the message sharing device 110. In some cases, the message sharing device 110 and the processors 400 thereon may execute one or more applications to receive and/or solicit a message to be shared and/or broadcast. These applications may provide limits associated with the message, such as length limits and/or character count limits. In some cases, the applications and user interfaces may disallow entry of a message that may be too long to incorporate onto the beacon signal.

At block 1104, the message may be transmitted to a base station. The transmission of the message may be in a format and/or protocol that is pre-established between the message sharing device 110 and the base station 220. In some cases, the message may be in a format that may be inserted into a data field of a beacon signal by the base station 220. It will be appreciated that in certain example embodiments, the message sharing device 110 may be paired with the base station 220. In other example embodiments, the message sharing device 110 may not be paired with the base station 220. In this case, the message sharing device 110 may not be able to access the networks 160 via the base station 220.

At optional block 1106, a confirmation that the message is to be broadcasted by the base station may be received. In this case the message sharing device 110 may be able to indicate to a user of the message sharing device 110 that his/her message is queued to be broadcast by the base station 220.

It will be appreciated that in certain example embodiments, the broadcasting of the message may be a commercial enterprise and there may be payments made by an entity that wishes to broadcast a message to an entity associated with and/or controlling the base station 220. Therefore, in certain example embodiments, such transfer of payments for the broadcast of the message may be enabled.

It should be noted that the method 1100 may be modified in various ways in accordance with certain embodiments. For example, one or more operations of the method 1100 may be eliminated or executed out of order in other embodiments. Additionally, other operations may be added to the method 1100 in accordance with other embodiments.

Figure 12:
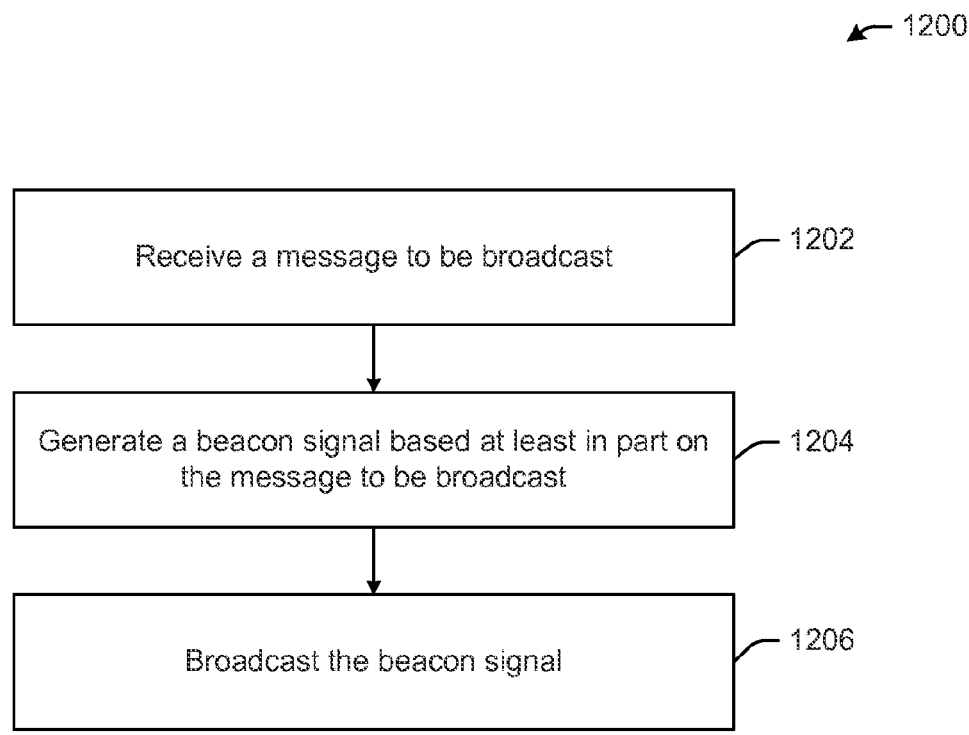
FIG. 12 is a flow diagram illustrating an example method for broadcasting messages by the base station of FIG. 5, in accordance with example embodiments of the disclosure.

FIG. 12 is a flow diagram illustrating an example method 1200 for broadcasting messages by the base station 220 of FIG. 5, in accordance with example embodiments of the disclosure. The base station 220 may broadcast a beacon signal carrying the message in cooperation with one or more other entities of environments 100, 200, 300.

At block 1202, a message to be broadcast may be received. The message may be received from the message sharing device 220. In some example cases, the message may already conform to the limits placed on the message for broadcast, such as message length. In other example cases, the base station 220 may determine if the received message conforms to threshold limits, such as message length for broadcast in accordance with the method 1200 described herein.

At block 1204, a beacon signal may be generated based at least in part on the message to be broadcast. As discussed in reference to block 704 of method 700 of FIG. 7, the message may be incorporated within one or more data fields of the beacons signal. In certain example embodiments, the message may be incorporated into the SSID field of the beacon signal. At block 1206, the beacon signal may be broadcast. In certain embodiments, the radio 512, antennas 500, and processors 512 may cooperate to modulate the beacon signal and transmit via RF channels corresponding to the protocols used, such as Wi-Fi, Wi-Fi direct, Bluetooth, or the like.

It should be noted that the method 1200 may be modified in various ways in accordance with certain embodiments. For example, one or more operations of the method 1200 may be eliminated or executed out of order in other embodiments. Additionally, other operations may be added to the method 1200 in accordance with other embodiments.

Figure 13:
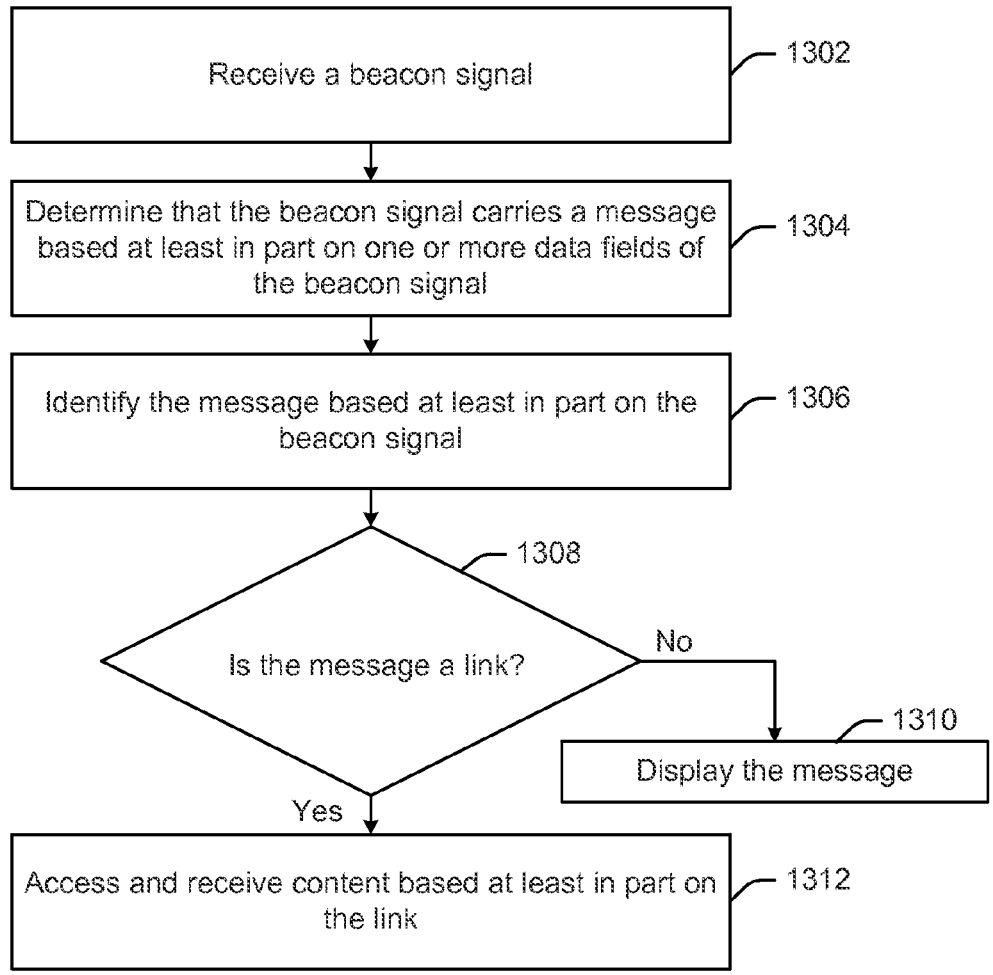
FIG. 13 is a flow diagram illustrating an example method for receiving messages by the message receiving device of FIG. 6, in accordance with example embodiments of the disclosure.

FIG. 13 is a flow diagram illustrating an example method 1100 for receiving messages by the message receiving device 130 of FIG. 6, in accordance with example embodiments of the disclosure. The method 1300 may be performed by the message receiving device 130 in cooperation with one or more other entities of the environments 100, 200, 300.

At block 1302 a beacon signal may be received. The beacon signal may be received and processed using existing infrastructure and/or algorithms of the message receiving device 130 used for communications via a variety of protocols, such as Wi-Fi, Wi-Fi direct, and/or BT. In certain example embodiments, the beacon signal may be received as one or more data packets and may be received while the message receiving device 130 and the processors 600 thereon are listening for beacon signals. At block 1304, it may be determined that the beacon signal carries a message based at least in part on one or more data fields of the message signal. As discussed above, a sequence of characters may be detected in one or more data fields, such as by parsing the beacon signal, that indicates the beacon signal is carrying a message. The sequence of characters may be characters that would otherwise not likely be incorporated within the beacon signal, such as, for example, a sequence "!@#." This sequence of characters may be a predetermined sequence and/or a hash based on one or more other identifiers, such as the SSID associated with the transmitting base station 220 and/or message sharing device 110. The sequence in certain example embodiments, may be incorporated as the initial characters within the SSID field 806 or the sync word field 904. The parsing may include a bit-by-bit and/or character-by-character analysis of the fields of the beacon signals 800, 900. This may include, for example, regular expressions, pattern matching, recursive parsing, or the like.

At block 1306, the message may be identified based at least in part on the beacon signal. The message receiving device 130 may parse the data of the beacon signal and/or access the data field(s) that carry the message to identify the message. At block 1308, it may be determined if the message is a link or network address. This link or network address may be to content available on the networks 160, such as content served by the content servers 170. If at block 1308 it is determined that the message is not a link, then the message may be displayed at block 1310. The message may be displayed, for example, on the display screen 134 of the message receiving device 130.

If, however, it was determined at block 1308 that the message is a link or network address, then optionally at block 1312, content may be accessed and received based at least in part on the link. The content may be accessed by the message receiving device 130 either via the entity from which it received the message, such as the base station 220 and/or the message sharing device 110, or via the out-of-band communications link 150. It should be noted, therefore, that the message receiving device 130 may access the content associated with a network address transmitted using the messaging systems and methods as described herein, without having to pair with a particular access point infrastructure, such as the bases station 220 and/or message sharing device 110. In alternative example embodiments, the message receiving device 220 may display the message with the link or network address, instead of automatically accessing the content of the network address. In some cases, the message receiving device 130 may enable the user 140 to select the network address, such as on the display screen 134 to retrieve content associated with the network address, such as from content servers 170.

It should be noted that the method 1300 may be modified in various ways in accordance with certain embodiments. For example, one or more operations of the method 1300 may be eliminated or executed out of order in other embodiments. Additionally, other operations may be added to the method 1300 in accordance with other embodiments.

Figure 14:
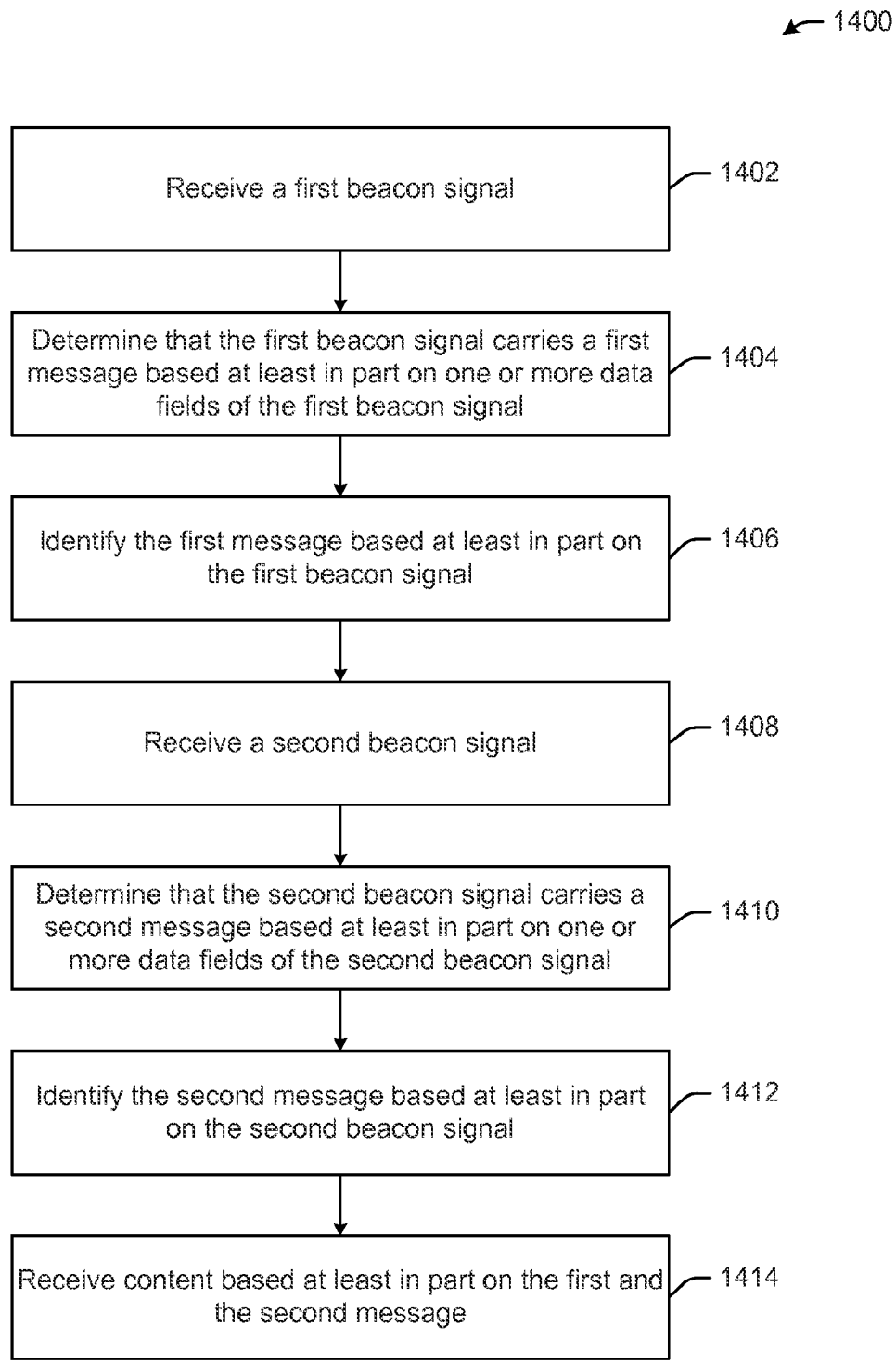
FIG. 14 is a flow diagram illustrating an example method for receiving content by the message receiving device of FIG. 6, in accordance with example embodiments of the disclosure.

FIG. 14 is a flow diagram illustrating an example method 1400 for receiving content by the message receiving device 130 of FIG. 6, in accordance with example embodiments of the disclosure. In this method 1400, two messages may be received by the message receiving device 130 in cooperation with other entities of environments 100, 200, 300. The method 1400 may be performed by the message receiving device 130 when the message sharing device 110 performs method 1000 or if the base station 220 performs a method similar to method 1000.

At block 1402, a first beacon signal may be received. This process may be similar to block 1302 of method 1300 of FIG. 13. At block 1404, it may be determined that the first beacon signal carries a first message based at least in part on one or more data fields of first beacon signal. This process may be similar to block 1304 of method 1300 of FIG. 13. At block 1406, the first message may be determined based at least in part on the first beacon signal. This process may be similar to block 1306 of method 1300 of FIG. 13. At block 1408, a second beacon signal may be received. This process may be similar to that of block 1402. At block 1410, it may be determined that the second beacon signal carries a second message based at least in part on one or more data fields of second beacon signal. This process may be similar to that of block 1404. At block 1412, the second message may be determined based at least in part on the second beacon signal. This process may be similar to that of block 1406.

At optional block 1414, content may be received based at least in part on the first and second message. In this case, one or both the first message may be used to retrieve the content by the message receiving device via networks 160 from content servers 170. In certain example embodiments, the first message and the second message may include portions of a larger message, such as a network address to a content server 170. In other example embodiments, the first message may include a network address to content on a content sever 170 and the second message may include authentication credentials that may be used to access the content at the network address provided by the first message.

It should be noted that the method 1400 may be modified in various ways in accordance with certain embodiments. For example, one or more operations of the method 1200 may be eliminated or executed out of order in other embodiments. Additionally, other operations may be added to the method 1200 in accordance with other embodiments.

Figure 15:
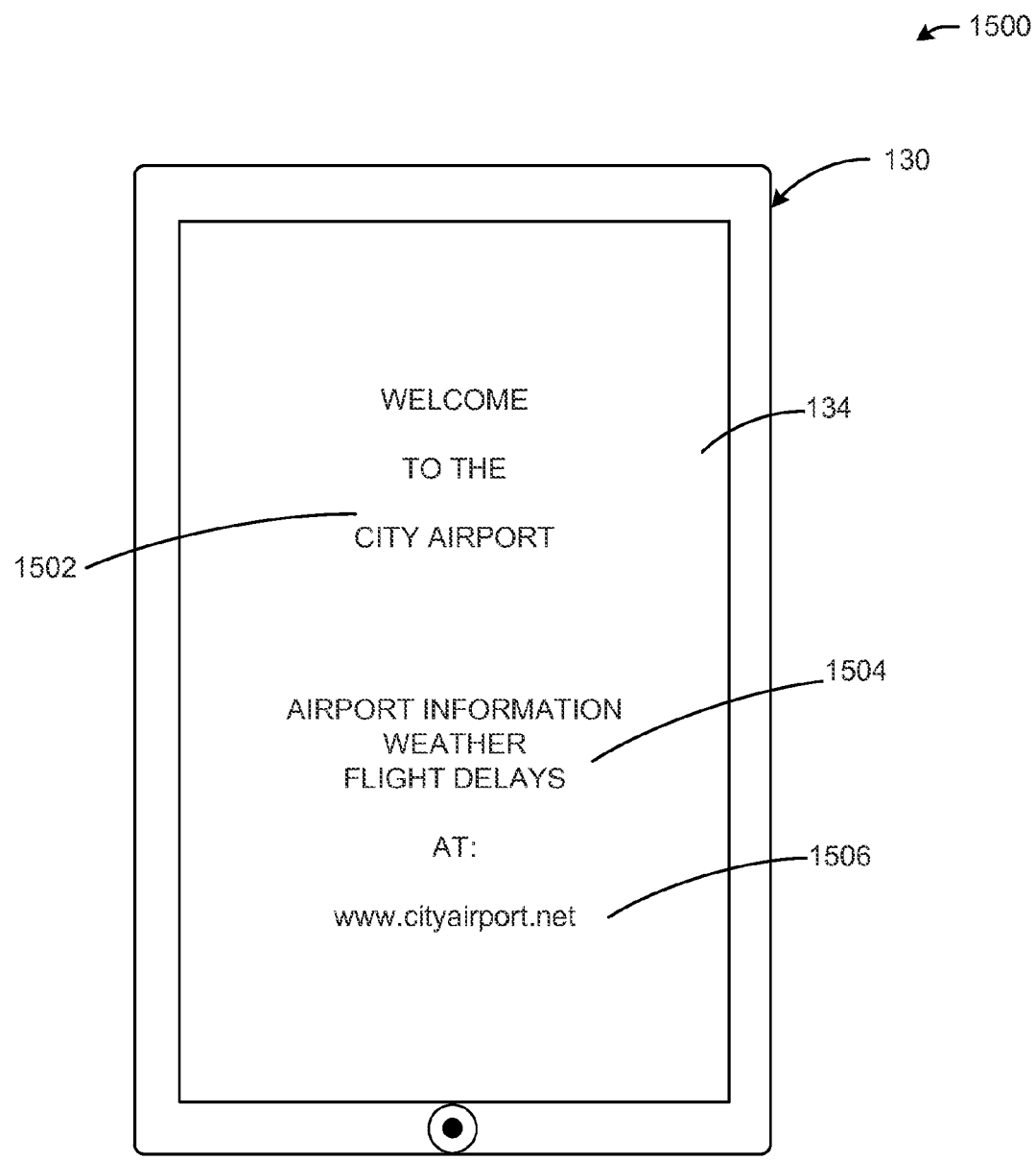
FIG. 15 is a schematic diagram illustrating an example scenario in which a message is received and displayed by the message receiving device of FIG. 6, in accordance with example embodiments of the disclosure.

FIG. 15 is a schematic diagram illustrating an example scenario 1500 in which a message is received and displayed by the message receiving device of FIG. 6, in accordance with example embodiments of the disclosure. In this example scenario 1500, the message receiving device may receive one or more messages and may display the content of those messages on the display screen 134 of the message receiving device 130. In this case, the message receiving device may be at the airport and the ESS Wi-Fi at the airport may broadcast the message as rendered herein. The message may include one or more text regions 1502, 1504 and/or one or more links or network addresses 1506. In this example, the link may be displayed to the user 140 and the user 140 may decide to access the content associated with that network address. For example, the network address may provide content related to the airport, such as weather and flight delays. The message receiving device 130 may receive the message, as depicted, without having to pair and/or purchase access to the airport Wi-Fi services. The message receiving device 130 may further access the content of the network address 1506 by pairing with the airport Wi-Fi service or via out-of-band network links 150, such as 4G LTE or 3G cell phone connection.

Figure 16:
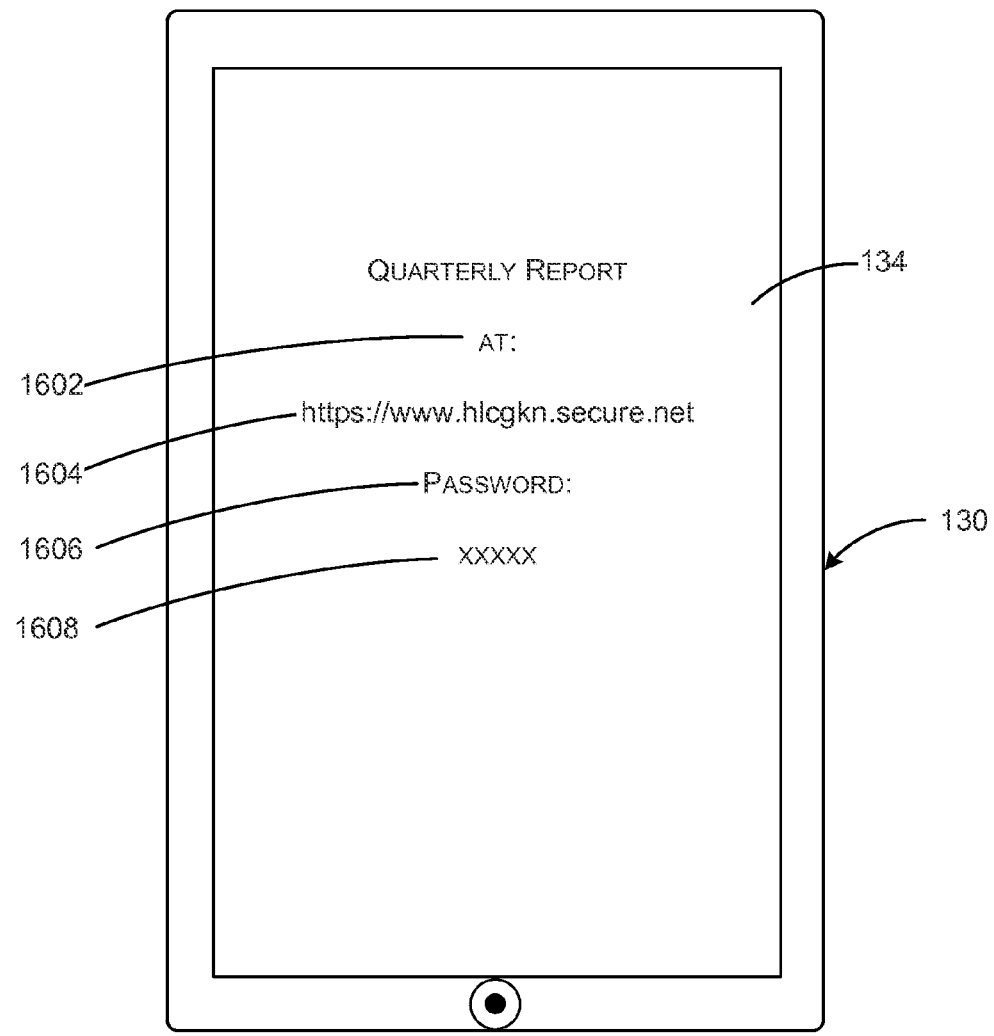
FIG. 16 is a schematic diagram illustrating another example scenario in which a message is received and displayed by the message receiving device of FIG. 6, in accordance with example embodiments of the disclosure.

FIG. 16 is a schematic diagram illustrating another example scenario 1400 in which a message is received and displayed by the message receiving device of FIG. 6, in accordance with example embodiments of the disclosure. In this case two messages may be received by the message receiving device. The first message may include text 1602 and network address 1604 to content. The second message may include text 1606 and a password 1608. The network address 1604 and the password 1608 may be used by the message receiving device 130 to access content, such as a quarterly report. In this use scenario 1600, confidential content may be provided to the message receiving device 130. This example scenario may be performed in a conference room where the message elements 1602, 1604, 1606, 1608 may be shared by a message sharing device 110 only with message receiving devices 130 in relatively close proximity to the message sharing device 130, such as in the same conference room. It will further be appreciated that in certain embodiments, the network address 1604 may be shared using the method 700 of FIG. 7 and the password 1608 may be shared in an out-of-band mechanism. For example, the password may be verbally communicated to participants of a meeting to ensure adequate security of the password and content.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. An electronic device, comprising:
   at least one memory that stores computer-executable instructions;
   at least one processor that accesses the at least one memory, wherein the at least one processor executes the computer-executable instructions to:
      receive a first beacon signal comprising one or more data fields including a service set identification (SSID) field;
      determine, based at least in part on the one or more data fields of the first beacon signal, that the beacon signal carries a first message in the SSID field;
      identify the first message based at least in part on the one or more data fields;
      present information regarding the first message to a user of the electronic device;
      receive a second beacon signal;
      determine, based at least in part on one or more second data fields of the second beacon signal, that the second beacon signal carries a second message;
      identify the second message based at least in part on the one or more second data fields; and
      present information regarding the second message to the user of the electronic device.

2. The electronic device of claim 1, wherein the at least one processor executes the computer-executable instructions to determine that the first beacon signal carries the first message by identifying a predetermined sequence of characters within the one or more data fields of the beacon signal.

3. The electronic device of claim 1, wherein the at least one processor executes the computer-executable instructions to identify the first message by parsing the SSID data field of the first beacon signal.

4. The electronic device of claim 1, wherein the first message is in at least one of: (i) base64 format; (ii) extensible markup language (XML) format; or (iii) American Standard Code for Information Interchange (ASCII) format.

5. The electronic device of claim 1, wherein the at least one processor further executes the computer-executable instructions to:
   determine that the first message includes a network address to content;
   request the content based at least in part on the network address;
   receive the content.

6. The electronic device of claim 1, wherein the at least one processor executes the computer-executable instructions further to:
   generate a third message by concatenating the first message and the second message; and
   display the third message.

7. A computer-implemented method, comprising:
   receiving, at a device comprising one or more processors, a first message to be broadcasted;
   generating, by the device, a first beacon signal, wherein the first beacon signal includes an indication that the first beacon signal carries the message, and the first beacon signal includes the first message in one or more data fields of the first beacon signal;
   broadcasting, by the device, the first beacon signal;
   receiving, by the device, a second message to be broadcast;
   generating, by the device, a second beacon signal, wherein the second beacon signal includes a second indication that the second beacon signal carries the second message, and the second beacon signal includes the second message in one or more data fields of the second beacon signal; and
   broadcasting, by the device, the second beacon signal.

8. The computer-implemented method of claim 7, wherein the first message in the first beacon signal is in at least one of: (i) base64 format; (ii) extensible markup language (XML) format; or (iii) American Standard Code for Information Interchange (ASCII) format.

9. The computer-implemented method of claim 7, wherein the indication that the first beacon signal carries the first message comprises a predetermined sequence of characters.

10. The computer-implemented method of claim 7, wherein generating the first beacon signal further comprises including the first message in a service set identification (SSID) data field of the first beacon signal.

11. The computer-implemented method of claim 7, wherein the first message comprises at least one of: (i) an advertisement for the availability of a wireless network access point, (ii) a network address to access content on a network; or (iii) authentication credentials to access the content on the network.

12. The computer-implemented method of claim 11, wherein the device is a base station and the message is received by the base station from a message sharing device.

13. The computer-implemented method of claim 7, further comprising:
   generating a third message by concatenating the first message and the second message; and
   displaying the third message.

14. At least one non-transitory computer-readable medium comprising computer-executable instructions that, when executed by one or more processors, executes a method comprising:

receiving a first message to be broadcasted;

generating a first beacon signal, wherein the first beacon signal includes an indication that the first beacon signal carries the first message and the first beacon signal includes the first message in one or more data fields of the first beacon signal;

broadcasting the first beacon signal;

receiving a second message to be broadcast; and generating a second beacon signal, wherein the second beacon signal includes a second indication that the second beacon signal carries the second message, and the second beacon signal includes the second message in one or more data fields of the second beacon signal; and broadcasting the second beacon signal.

15. The at least one non-transitory computer-readable medium of claim 14, wherein the indication that the first beacon signal carries the first message comprises a predetermined sequence of characters.

16. The at least one non-transitory computer-readable medium of claim 14, wherein generating the first beacon signal further comprises including the first message in a service set identification (SSID) data field of the first beacon signal.

17. The at least one non-transitory computer-readable medium of claim 14, wherein the first message comprises at least one of: (i) an advertisement for the availability of a wireless network access point, (ii) a network address to access content on a network; or (iii) authentication credentials to access the content on the network.

18. The at least one non-transitory computer-readable medium of claim 14, wherein the first message in the first beacon signal is in at least one of: (i) base64 format; (ii) extensible markup language (XML) format; or (iii) American Standard Code for Information Interchange (ASCII) format.

19. The at least one non-transitory computer-readable medium of claim 14, wherein the method further comprises:

receiving a request to connect to a network a from a message receiving device; and establishing a communicative link with the message receiving device.

20. The at least one non-transitory computer-readable medium of claim 14, wherein the method further comprises:

generating a third message by concatenating the first message and the second message; and displaying the third message.

\* \* \* \* \*